United States Patent
Loessl et al.

(10) Patent No.: US 11,058,070 B2
(45) Date of Patent: Jul. 13, 2021

(54) APPARATUS FOR GROWING PLANTS, AND CLIMATE CONTROL DEVICE OF THE APPARATUS FOR GROWING PLANTS

(71) Applicant: Agrilution GmbH, Munich (DE)

(72) Inventors: Maximilian Loessl, Munich (DE); Philipp Wagner, Fuerstenfeldbruck (DE)

(73) Assignee: Agrilution Systems GmbH, Munich (DE)

( * ) Notice: Subject to any disclaimer, the term of this patent is extended or adjusted under 35 U.S.C. 154(b) by 218 days.

(21) Appl. No.: 16/257,280

(22) Filed: Jan. 25, 2019

(65) Prior Publication Data
US 2019/0223391 A1    Jul. 25, 2019

(30) Foreign Application Priority Data
Jan. 25, 2018  (DE) .................... 10 2018 101 698.0

(51) Int. Cl.
| | | |
|---|---|---|
| *A01G 9/24* | (2006.01) | |
| *A01G 9/20* | (2006.01) | |
| *A01G 25/16* | (2006.01) | |
| *A01G 7/04* | (2006.01) | |
| *A01G 9/26* | (2006.01) | |

(52) U.S. Cl.
CPC ............ *A01G 9/246* (2013.01); *A01G 7/045* (2013.01); *A01G 9/20* (2013.01); *A01G 9/24* (2013.01); *A01G 9/247* (2013.01); *A01G 9/26* (2013.01); *A01G 25/16* (2013.01); *A01G 25/165* (2013.01); *A01G 25/167* (2013.01)

(58) Field of Classification Search
CPC ...... A01G 9/246; A01G 9/247; A01G 25/165; A01G 25/167; A01G 7/045; A01G 9/26; A01G 9/24; A01G 9/249; A01G 2031/006; A01G 31/06
See application file for complete search history.

(56) References Cited

U.S. PATENT DOCUMENTS

| | | | | |
|---|---|---|---|---|
| 8,234,812 B1 * | 8/2012 | Colless | .................... | A01G 9/16 47/61 |
| 8,910,419 B1 * | 12/2014 | Oberst | .................. | A01G 31/06 47/60 |
| 2003/0005626 A1 | 1/2003 | Yoneda et al. | | |
| 2003/0101645 A1 * | 6/2003 | Cole | ..................... | A01G 31/02 47/61 |

(Continued)

FOREIGN PATENT DOCUMENTS

| | | |
|---|---|---|
| DE | 102015118059 | 4/2017 |
| DE | 102016222326 | 1/2018 |

*Primary Examiner* — Trinh T Nguyen
(74) *Attorney, Agent, or Firm* — Barnes & Thornburg LLP; Jeffrey R. Stone

(57) ABSTRACT

In various embodiments, an apparatus for growing plants is provided. The apparatus may include an irrigation apparatus, an illumination apparatus, a climate control device, an accommodating space for accommodating one or more seed mats, a controller which is configured to control the irrigation apparatus, the illumination apparatus and the climate control apparatus by means of a program controller, at least one air humidity sensor for determining an air humidity in the accommodating space, and at least one temperature sensor for determining an air temperature in the accommodating space.

11 Claims, 9 Drawing Sheets

(56) References Cited

U.S. PATENT DOCUMENTS

| | | | |
|---|---|---|---|
| 2011/0232186 A1* | 9/2011 | Lewis | A01G 9/1423 47/66.6 |
| 2014/0020292 A1* | 1/2014 | McNamara | A01G 9/24 47/66.6 |
| 2014/0090295 A1* | 4/2014 | Fambro | A01G 9/1423 47/62 N |
| 2014/0115958 A1* | 5/2014 | Helene | A01G 31/06 47/17 |
| 2017/0035008 A1* | 2/2017 | Ellins | A01G 31/02 |
| 2017/0094920 A1* | 4/2017 | Ellins | A01G 31/02 |
| 2017/0169679 A1* | 6/2017 | Johnson | E05B 47/0012 |
| 2018/0184602 A1* | 7/2018 | Ofir | A01G 7/045 |
| 2019/0183062 A1* | 6/2019 | Pham | A01G 31/06 |
| 2019/0261589 A1* | 8/2019 | Pham | A01G 9/0297 |

* cited by examiner

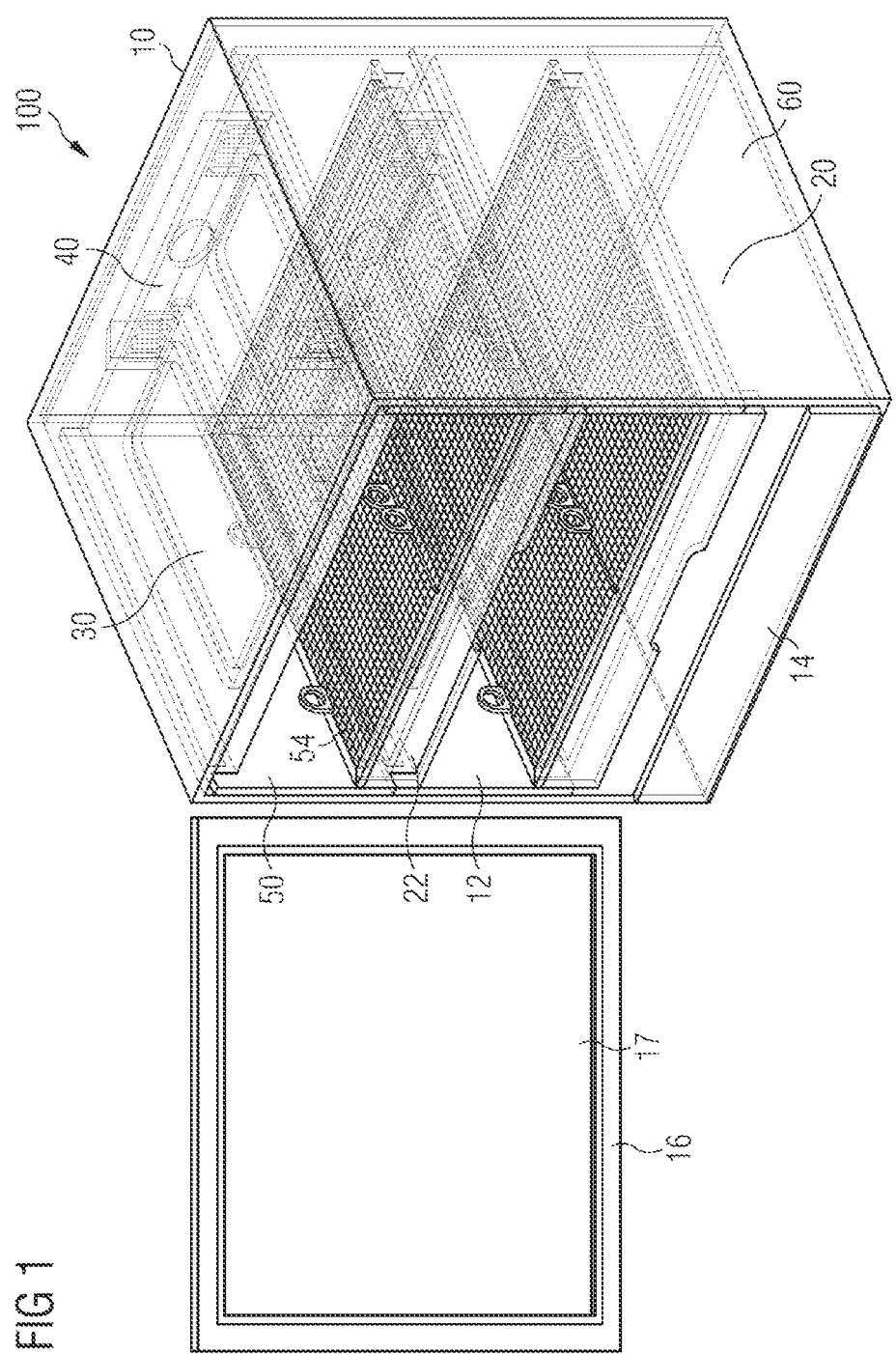

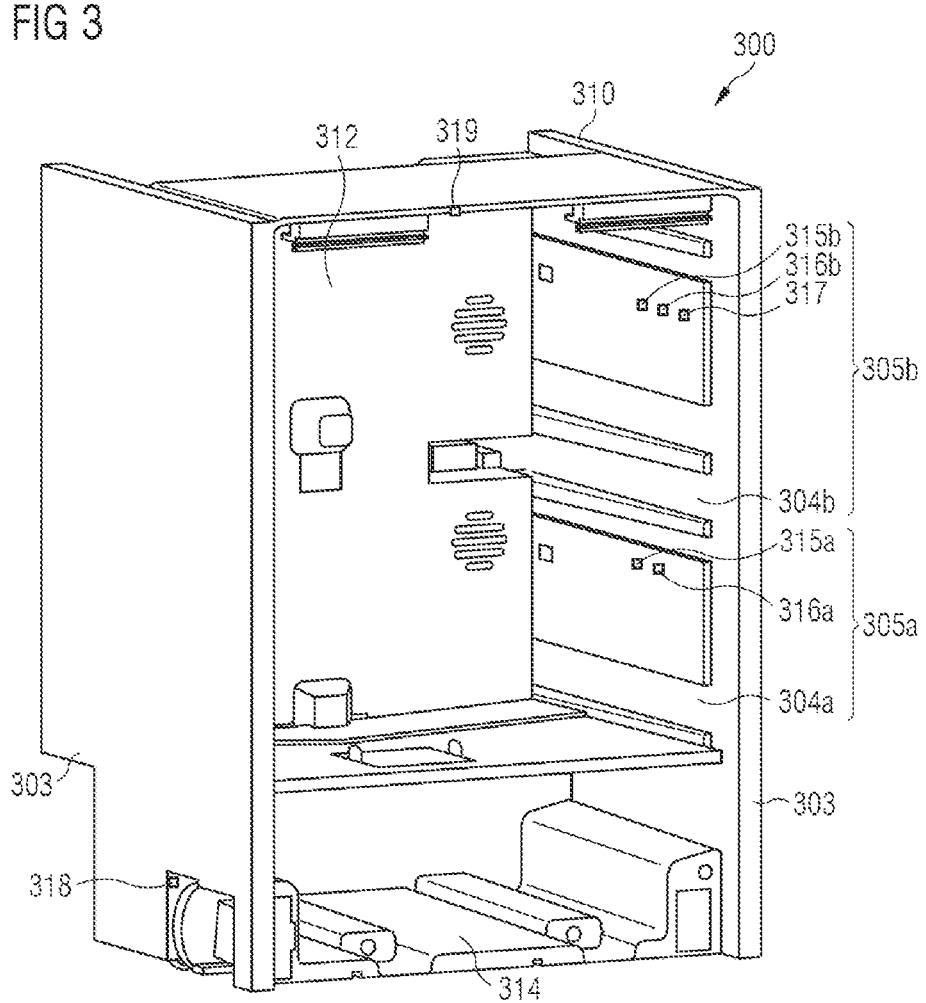

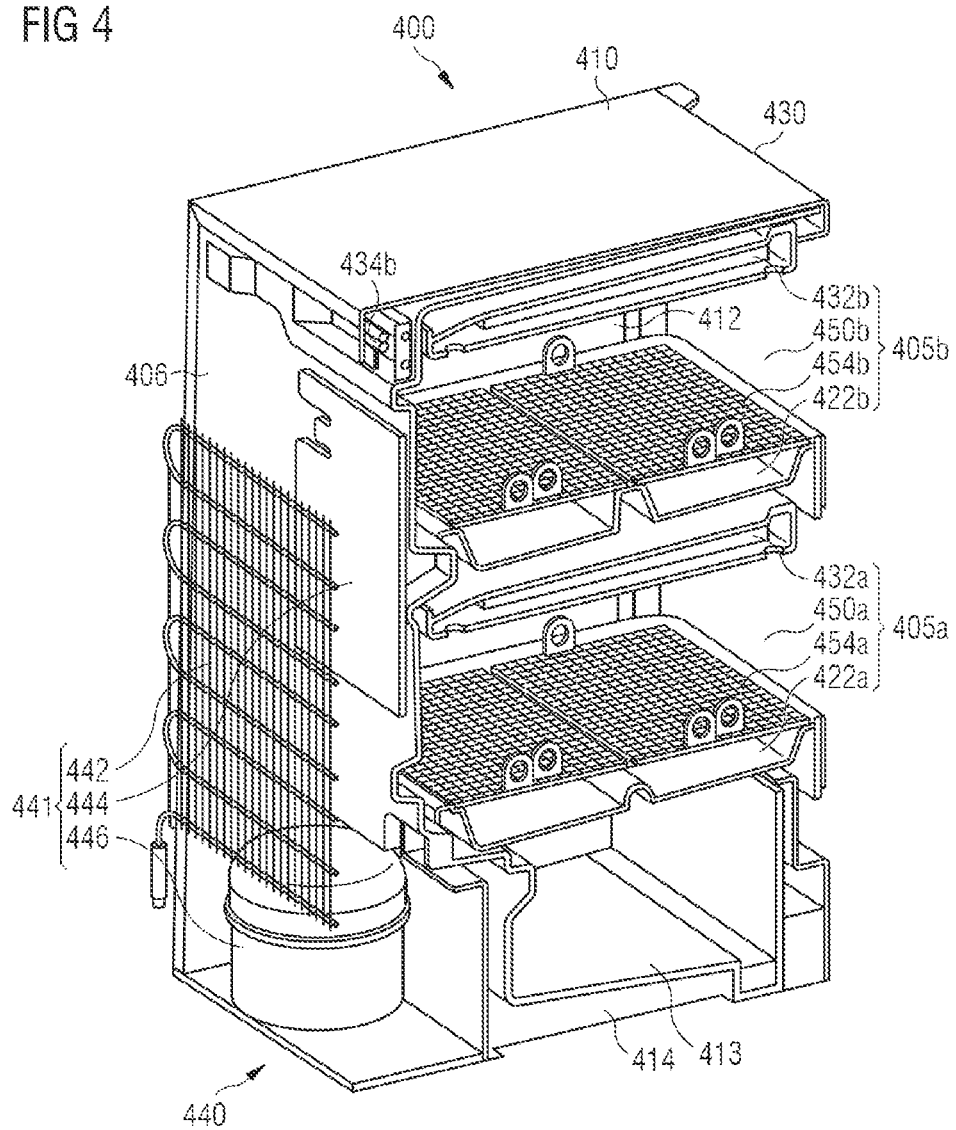

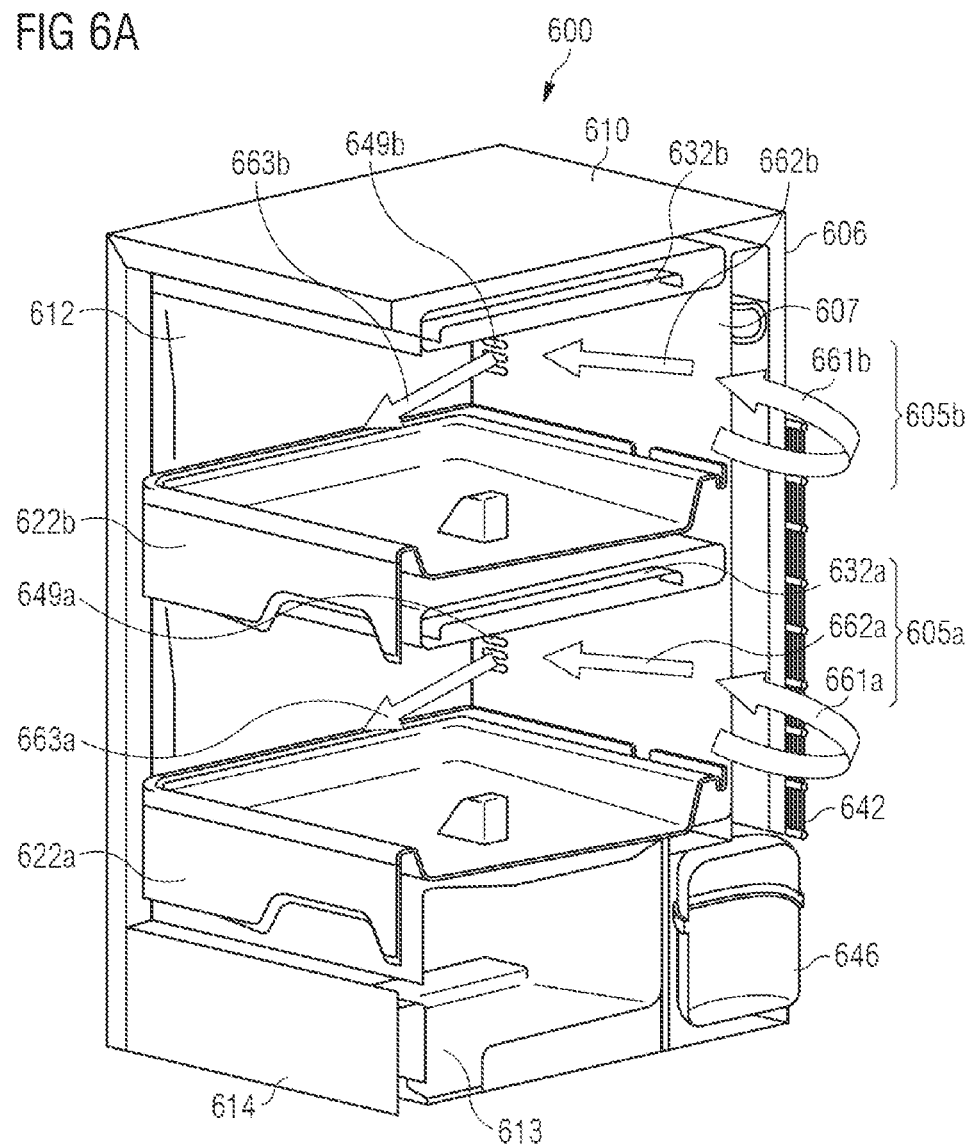

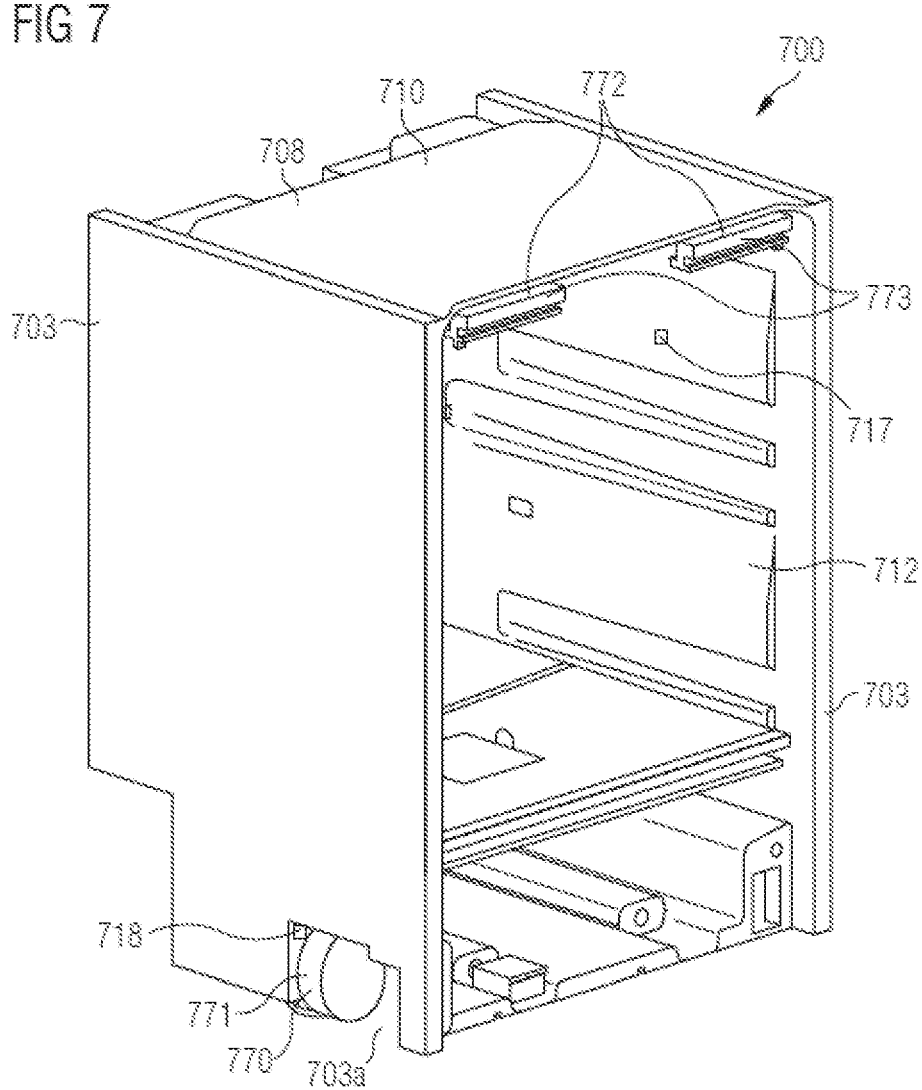

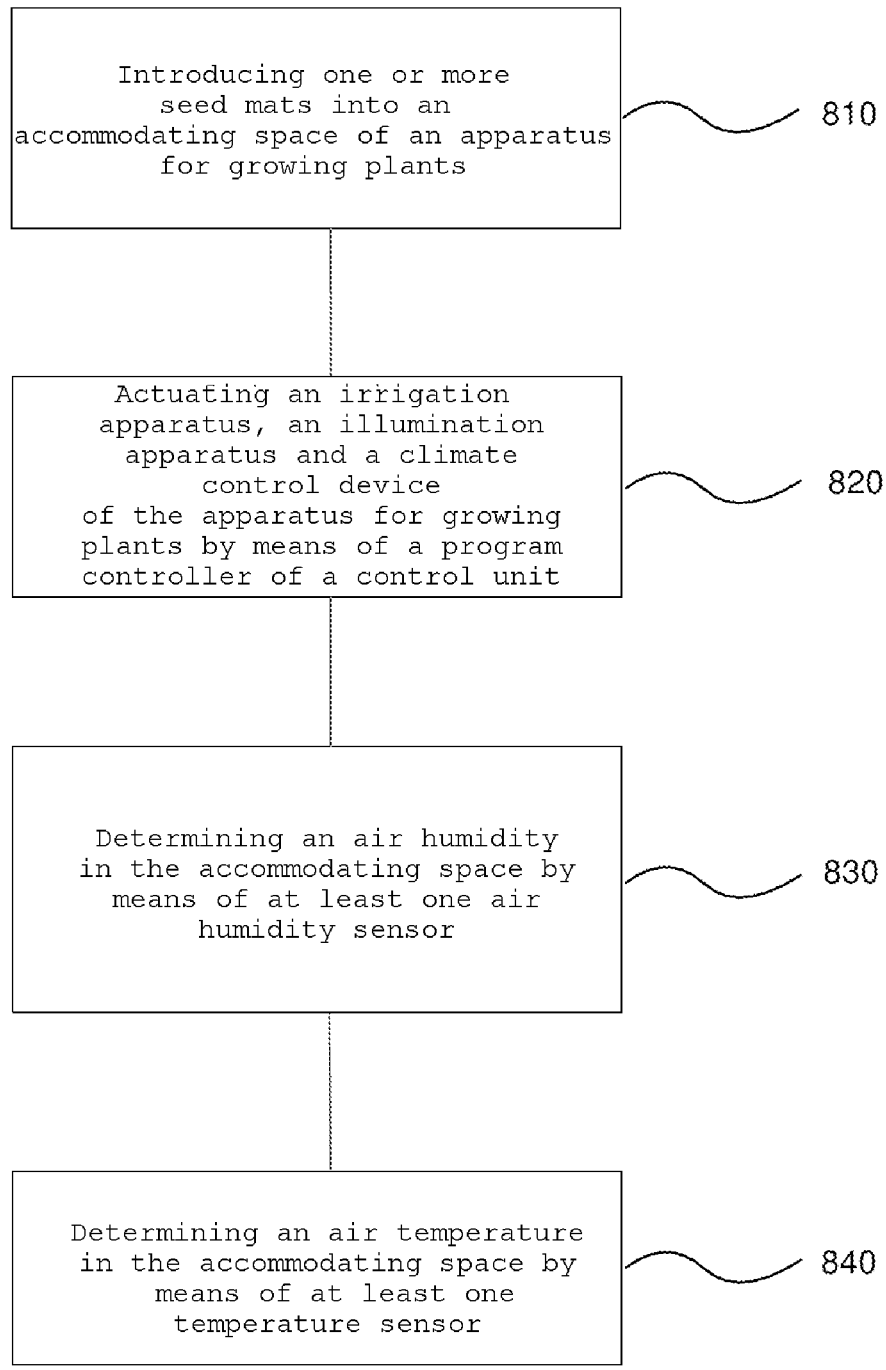

APPARATUS FOR GROWING PLANTS, AND CLIMATE CONTROL DEVICE OF THE APPARATUS FOR GROWING PLANTS

CROSS-REFERENCE TO RELATED APPLICATION

This application claims priority to German Patent Application Serial No. 10 2018 101 698.0, which was filed Jan. 25, 2018, and is incorporated herein by reference in its entirety.

TECHNICAL FIELD

Various embodiments relate generally to an apparatus for growing plants, and relate e.g. to a climate control device of the apparatus for growing plants and to a method for growing plants.

BACKGROUND

In the field of the provision of fresh products such as for example herbs, salad, fruit and vegetables, consumer demands have grown to an increasing extent in recent years. In particular since the denunciation of abuses in the husbandry of animals for slaughter, and the increasing prevalence of vegetarian or vegan foods, the awareness of many consumers of fresh products, and their demand for these, has increased.

These products have hitherto for the most part been produced either on fields or in greenhouses of large industrial operations and brought to the consumers by being sold in supermarkets. To a lesser extent, the consumers also obtain a supply directly from the producer at weekly markets and from direct selling on farms, wherein these distribution channels are available only to a relatively small part of the population owing to the restricted time availability or the required spatial proximity to the producer.

With the increased awareness of large parts in particular of the urban population with regard to their own health, there is, specifically in this case, an increasingly growing demand for products from controlled cultivation, and even the desire for personal control and meaningful engagement in the cultivation of one's own, correspondingly fresh products.

However, only a very small part of the urban population has access to a garden or corresponding facilities in which, for example, they could set up their own small greenhouses in order to cultivate fresh products. Also, the urban environment seldom offers the possibility of handling planting boxes and pots without relatively great organizational effort, let alone providing the plants cultivated therein firstly with the required protection against weather influences and secondly with adequate sunlight in order to promote the desired growth of the plants.

Furthermore, specifically the urban population commonly has a daily routine involving working away from home and often long traveling distances to and from the workplace, such that there is no desire, aside from everything else, to also tend to the growth of plants, to monitor this growth, and to adapt the care of these plants to the respective growth phase.

Owing to all these difficulties, many people who would in fact gladly benefit from cultivating their own plants and harvesting their own products are put off by the effort that the cultivation of these plants entails. They are put off even more by the feeling that there is a very low likelihood that, after all the effort, fresh ingredients from one's own cultivation will in fact be worthwhile, because, in hectic urban everyday life, it is not possible to ensure care of the plants which is sufficiently optimal that it leads to good results.

In terms of the informed consumer who intentionally wishes to eat healthily and at the same time is intent on achieving sustainability but has neither the space nor the time to cultivate plants in the conventional manner, it is thus desirable to create a means with which even small consumers, such as for example the typical modern single urban resident, can independently supply themselves with fresh food ingredients to the desired extent.

In the context of these demands, an apparatus has recently been proposed with the aid of which even individual consumers can, on a small scale adapted to common kitchen sizes, grow herbs, salads, vegetables, mushrooms or fruit.

A particular problem in the case of such growth of plants is that, aside from the supply of water and nutrients, they require further ambient conditions which benefit plant growth, wherein these ambient conditions vary from one plant type to another and over the course of the germination and growth of the plants. Here, the temperature and humidity of the surrounding air must be constantly monitored and regulated. Here, substantial automation of the ambient conditions in the apparatus for growing plants is desirable.

SUMMARY

In various embodiments, an apparatus for growing plants is provided. The apparatus may include an irrigation apparatus, an illumination apparatus, a climate control device, an accommodating space for accommodating one or more seed mats, a controller which is configured to control the irrigation apparatus, the illumination apparatus and the climate control apparatus by means of a program controller, at least one air humidity sensor for determining an air humidity in the accommodating space, and at least one temperature sensor for determining an air temperature in the accommodating space.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows an apparatus for growing plants according to various embodiments;

FIG. 3 shows a view of the apparatus for growing plants according to various embodiments from a semi-frontal perspective;

FIG. 4 shows a cross-sectional view of the apparatus for growing plants according to various embodiments from a lateral perspective;

FIG. 6A shows an illustration for explaining the air movement for the climate control of an accommodating space of the apparatus for growing plants according to various embodiments;

FIG. 7 shows an illustration of a housing of the apparatus for growing plants according to various embodiments from a semi-frontal perspective; and FIG. 8 shows a flow diagram of a method for growing plants according to various embodiments.

DESCRIPTION

Figure 2C:
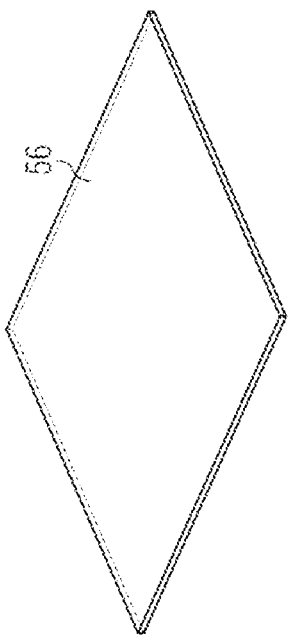
FIG. 2C shows a mat carrier for insertion onto an irrigation trough according to various embodiments.

The following detailed description refers to the accompanying drawings that show, by way of illustration, specific details and embodiments in which the invention may be practiced.

In the detailed description that follows, reference is made to the appended drawings, which form a part of this application and which, for illustrative purposes, show specific embodiments in which the invention may be implemented. In this regard, directional terminology such as for example "at the top", "at the bottom", "at the front", "at the rear", "front", "rear", etc. is used in relation to the orientation of the described figure(s). Since components of embodiments may be positioned in a number of different orientations, the directional terminology serves for illustrative purposes and is in no way restrictive. It is self-evident that other embodiments may be utilized and structural or logical modifications made without departing from the scope of protection of the present invention. It is self-evident that the features of the various embodiments described herein may be combined with one another unless specifically stated otherwise. The following detailed description therefore should not be considered in a restrictive sense, and the scope of protection of the present invention is defined by the appended claims.

In the context of this description, the expressions "connected", "attached" and "coupled" are used to describe both a direct and an indirect connection, a direct or indirect attachment, and a direct or indirect coupling. In the figures, identical or similar elements are denoted by identical reference symbols where expedient.

An apparatus for growing plants according to various embodiments is illustrated in FIG. 1.

As illustrated in FIG. 1, the apparatus for growing plants 100 may include a cabinet-like housing 10 which may be equipped with an accommodating space 12, a base 14 and a door 16, which may include an observation opening 17. Furthermore, the apparatus may include an irrigation apparatus 20, at least one illumination apparatus 30 and a climate control device 40. Furthermore, in the apparatus, there may be provided a controller 60, which may be accommodated in the base 14 of the apparatus, wherein the controller 60 may actuate the illumination apparatus 30, the climate control device 40 and the irrigation apparatus 20 by means of a program controller. The climate control device 40 will be described in more detail with reference to FIG. 3 to FIG. 7.

Depending on the size of the apparatus, one or more growing units 50 of drawer-like form may be introduced into the accommodating space 12 of the apparatus for growing plants. The growing units 50 may each include an irrigation trough 22 and one or more mat carriers 54, and will be described in more detail with reference to FIG. 2A to FIG. 2D.

Figure 2D:
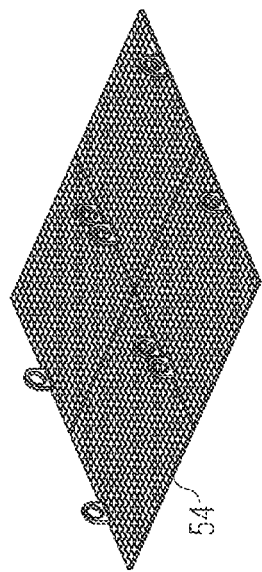
FIG. 2D shows a seed mat for placing onto a mat carrier according to various embodiments.
Figure 2A:
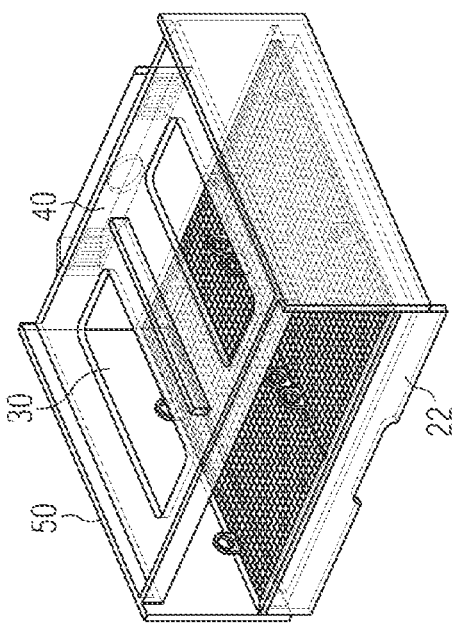
FIG. 2A shows a growing unit for introduction into the apparatus for growing plants according to various embodiments.
Figure 2B:
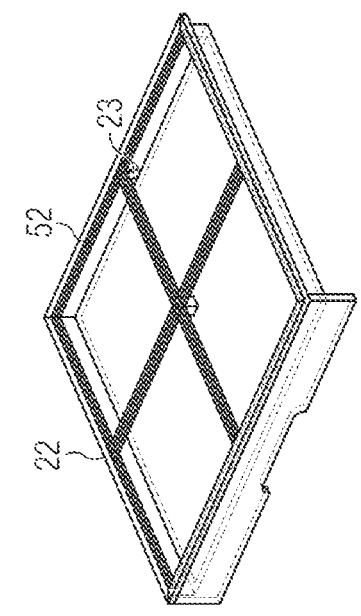
FIG. 2B shows an irrigation trough of a growing unit according to various embodiments.

FIG. 2A shows a growing unit for introduction into the apparatus for growing plants according to various embodiments. FIG. 2B shows an irrigation trough of a growing unit according to various embodiments. FIG. 2C shows a mat carrier for insertion onto an irrigation trough according to various embodiments. FIG. 2D shows a seed mat for placing onto a mat carrier according to various embodiments.

As illustrated in FIG. 2A, each growing unit 50 may be composed of an irrigation trough 22 with an associated illumination apparatus 30 arranged above said irrigation trough and with an associated component, arranged on a rear side of the growing unit 50, of the climate control device 40 (for example an attachment to the climate control device 40 or another component of the climate control device 40). Here, each growing unit 50 may define a storey, so to speak, into which seeds and/or plants may be introduced into the accommodating space 12 of the apparatus and grown there. For this purpose, as illustrated in FIG. 2B, each of the irrigation troughs 22 may include an exemplarily subdivided frame-like structure which may form one to four placement openings 52. One to four mat carriers 54 (FIG. 2C) of different size may be placed onto the frame-like structure of the placement openings 52, which mat carriers may in turn be equipped with corresponding seed mats 56 (FIG. 2D) (in other words, onto which corresponding seed mats 56 may be placed). Furthermore, each irrigation trough 22 may include a water inlet and outlet 23.

According to various embodiments, the irrigation apparatus 20 (see FIG. 1) may be configured for admitting the water required for plant growth into the irrigation trough 22, and removing said water from said irrigation trough, by means of the water inlet and outlet 23 (see FIG. 2B). For this purpose, according to various embodiments, the irrigation apparatus 20 may include a water circuit system (not illustrated) by means of which water may be fed to the irrigation troughs 22 from a water tank (not illustrated) arranged in the base 14. In various embodiments, the irrigation apparatus 20 may also be configured to feed various nutrients (not illustrated) to the water in the water circuit system. Furthermore, in various embodiments, the irrigation apparatus 20 may be configured to purify and/or filter (not illustrated) the water in the water circuit system.

FIG. 3 shows a view of the apparatus for growing plants according to various embodiments from a semi-frontal perspective.

As illustrated in FIG. 3, the apparatus for growing plants 300 includes, in various embodiments, a cabinet-like housing 310, which in this case is illustrated from a semi-frontal perspective. For the sake of simplicity, a door of the housing 310 has been omitted in this illustration.

The housing 310 may include a base 314 in which, for example, a water tank (not illustrated) of an irrigation apparatus 20 (not illustrated, see FIG. 1) may be accommodated. A temperature sensor 318 for determining an ambient temperature may be provided on a side wall 303 of the housing 310. For example, the temperature sensor may be arranged on an outer side of the side wall 303 of the housing 310.

The housing 310 includes an accommodating space 312 which may be configured for accommodating at least one drawer-like growing unit (not illustrated, see FIGS. 2A-2D). Here, each of the growing units may be configured such that at least one seed mat may respectively be placed thereon. In other words, the accommodating space may be configured for accommodating one or more seed mats.

The apparatus for growing plants may furthermore include a controller 60 (not illustrated, see FIG. 1). Furthermore, the apparatus may include the irrigation apparatus 20 (not illustrated, see FIG. 1), at least one illumination apparatus 30 (not illustrated, see FIG. 1) and a climate control device 40 (not illustrated, see FIG. 1). The controller may be configured to actuate the illumination apparatus, the climate control device and the irrigation apparatus by means of a program controller.

As may be seen from FIG. 3, side walls 303 of the housing 310 may include guide rails 304 for accommodating the growing units (not illustrated). For example, one or more guide rails 304 may be arranged on each of the side walls 303 such that one or more growing units (not illustrated) may be arranged one above the other in the manner of storeys in the accommodating space 312. For example, an apparatus for growing plants 300 may include a lower storey 305*a* and an upper storey 305*b* in the accommodating space 312. In other words, one growing unit (not illustrated) may, for example, respectively be introduced by means of the first guide rails 304*a* and/or the second guide rails 304*b* into the accommodating space 312 such that a lower storey 305*a* and/or an upper storey 305*b* is formed.

The side walls 303 of the housing 310 may furthermore include various sensors of the climate control device. For example, in the side walls 303, there may be arranged at least one air humidity sensor 315 for determining the air humidity in the accommodating space 312, at least one temperature sensor 316 for determining an air temperature in the accommodating space 312, and a $CO_2$ sensor 317 for determining a $CO_2$ content of the air in the accommodating space 312. For example, the lower storey 305*a* may include a first air humidity sensor 315*a* and a first temperature sensor 316*a*, and the upper storey 305*b* may include a second air humidity sensor 315*b* and a second temperature sensor 316*b*. The upper storey 305*b* may furthermore include the $CO_2$ sensor 317 as illustrated in FIG. 3. Alternatively, the $CO_2$ sensor 317 may also be arranged (not illustrated) in the lower storey 305*a*.

Alternatively, the first air humidity sensor 315*a* and the first temperature sensor 316*a* may be designed, or in other words formed, as a combined air humidity-temperature sensor (not illustrated). Likewise, the second air humidity sensor 315*b* and the second temperature sensor 316*b* may be designed, or in other words formed, as a combined air humidity-temperature sensor (not illustrated). Furthermore, an air humidity sensor, a temperature sensor and the $CO_2$ sensor may be designed as a combined air humidity-temperature-$CO_2$ sensor (not illustrated).

The controller may in particular be configured to receive measured values determined by the various sensors 315, 316, 317, 318, or in other words sensor values determined by the various sensors 315, 316, 317, 318. For example, the controller 60 may be configured to receive, from the air humidity sensors 315*a*, 315*b*, measured values or sensor values for the air humidity determined in the respective storey 305*a*, 305*b*. Likewise, the controller 60 may be configured to receive, from the temperature sensors 316*a*, 316*b*, measured values or sensor values for the air temperature determined in the respective storey 305*a*, 305*b*. The controller 60 may also be configured to receive, from the $CO_2$ sensor 317, measured values or sensor values for the $CO_2$ content determined in the accommodating space 312. Furthermore, the controller 60 may be configured to receive measured values or sensor values from the temperature sensor 318 for determining the ambient temperature.

As already stated above, the controller 60 may furthermore be configured to control the irrigation apparatus 20, the illumination apparatus 30 and the climate control apparatus 40 of the apparatus 300 by means of the program controller. For example, the controller 60 may be designed to regulate an interior space climate prevailing in the accommodating space 312 by means of the climate control device 40 on the basis of the sensor values determined for the air humidity and for the air temperature in the accommodating space 312. In various embodiments, the controller 60 may be designed to regulate a microclimate prevailing in the respective storey 305*a*, 305*b* by means of the climate control device 40 on the basis of the sensor values determined for the air humidity and for the air temperature of the respective storey 305*a*, 305*b*.

In other words, the controller 60 may be configured to adjust an air temperature and an air humidity in the accommodating space 312 on the basis of the sensor values of the sensors 315, 316. For example, the controller may be configured to adjust a climate in the accommodating space 312 or in an individual storey 305*a*, 305*b* on the basis of the sensor values determined by the temperature sensors 315*a*, 315*b* and the air humidity sensors 316*a*, 316*b*, or in other words on the basis of the determined temperature sensor values and the determined air humidity sensor values.

The controller 60 may for example be configured to actuate the climate control device 40 (not illustrated) such that the air temperature is regulated on the basis of the determined temperature sensor values. For this purpose, the climate control device 40 may for example include a cooling appliance (not illustrated, see for example FIG. 4, reference symbol 441), wherein the cooling appliance may include a condenser (not illustrated, see for example FIG. 4, 442), an evaporator (not illustrated, see for example FIG. 4, 444) and a compressor (not illustrated, see for example FIG. 4, 446).

In various embodiments, the control device 60 may be configured to actuate the climate control device 40 for example such that the air temperature in the accommodating space 312 is lowered by means of the cooling appliance (not illustrated). Furthermore, the control device 60 may be configured to increase the air temperature in the accommodating space 312 for example by means of a heat quantity radiated by the illumination apparatus 30 (not illustrated, see FIG. 1).

Furthermore, the control device 60 may be configured to regulate the air humidity in the accommodating space 312 by means of the evaporator (not illustrated).

The climate control device 40 may furthermore include at least one cooling blower (not illustrated) and at least one LED cooling blower (not illustrated). The controller 60 may be configured to actuate the cooling blower of the climate control device such that the air temperature in the accommodating space is regulated. Furthermore, the controller may be configured to actuate the LED cooling blower of the climate control device such that heat that is radiated by LED modules of the illumination device 30 is dissipated. The at least one cooling blower and the at least one LED cooling blower will be described in more detail with reference to FIG. 4 to FIG. 6C.

The housing 310 may furthermore include a door sensor 319, wherein the door sensor 319 is configured to determine whether a door (not illustrated, see door 16 of FIG. 1) of the apparatus for growing plants 300 is open or closed. The door sensor 319 may for example include an IR sensor 319. In various embodiments, signals of the door sensor 319 may be fed to the controller (not illustrated). In other words, the controller may be configured to receive signals of the door sensor 319 relating to whether the door of the apparatus is open or closed.

In various embodiments, the controller (not illustrated) may be configured to, when the door is open, actuate the irrigation apparatus, the illumination apparatus and the climate control device such that the user can for example handle the seed mats in the accommodating space. For example, in various embodiments, the controller may be configured to, when the door is open, actuate the illumination apparatus such that light with a spectral composition is emitted such that the accommodating space 312 is illuminated normally for a user (in other words, that light of a spectral composition visible to the user, or in other words again in a spectral composition in the case of which the user can see clearly, is emitted). The controller may furthermore for example be configured to, when the door is open, actuate the irrigation apparatus such that no water is fed to the irrigation troughs. Furthermore, the controller may for example be configured to, when the door is open, actuate the climate control device such that the at least one cooling blower is deactivated.

Furthermore, in various embodiments, the controller (not illustrated) may be configured to, when the door is closed, actuate the irrigation apparatus, the illumination apparatus and the climate control device such that an interior space climate adapted to the respective plants growing in the growing unit, and to the state of said plants, is produced. For example, the controller may be configured to, when the door is closed, actuate the illumination apparatus such that the respective plants growing in the accommodating space are irradiated with specific light of a spectral composition which benefits their growth. Furthermore, the controller may be configured to, when the door is closed, actuate the irrigation apparatus such that the seeds arranged on the seed mats, or the plants which grow from said seeds, are fed with water and nutrients in accordance with their state. Furthermore, the controller may be configured to, when the door is closed, actuate the climate control device such that the at least one cooling blower is activated if this is necessary in order to maintain, in the accommodating space, the interior space climate beneficial to the seeds arranged on the seed mats, or to the plants which grow from said seeds, in accordance with their state.

A method for growing plants and for controlling the climate of the accommodating space 312 of the apparatus for growing plants will be described with reference to FIG. 8.

FIG. 4 shows a cross-sectional view of the apparatus for growing plants according to various embodiments from a lateral perspective.

As illustrated in FIG. 4, the apparatus for growing plants 400 includes a housing 410, which in this case is illustrated in a cross-sectional view from a lateral perspective obliquely from the rear. The apparatus 400 furthermore includes a climate control device 440, wherein the climate control device 440 may include a cooling appliance 441, which may be arranged on a rear side wall 406 of the housing 410.

In various embodiments, the cooling appliance 441 may include a compressor 446, a condenser 442 and an evaporator 444. As has already been described above with reference to FIG. 3, the controller 60 (not illustrated, see FIG. 1) may be configured to actuate the cooling appliance 441 such that the interior space climate in an accommodating space 412 of the apparatus 400 is regulated. In other words, the controller 60 may be configured to actuate the compressor 446, the condenser 442 and the evaporator 444 such that the air temperature and the air humidity in the accommodating space 412 are regulated.

As illustrated in FIG. 4, one or more growing units 450 may be introduced into the accommodating space 412. Here, each of the growing units 450 may respectively include one irrigation trough 422, one or more mat carriers 454, and one illumination apparatus 430. For example, a first growing unit 450*a* which is arranged at the bottom in the accommodating space 412, and which includes a first (for example a lower) irrigation trough 422*a*, one or more mat carriers 454*a* and a first (for example a lower) LED module 432*a* of an illumination apparatus 430, may form a lower storey 405*a*. Likewise, a second growing unit 450*b* which is arranged at the top in the accommodating space 412, and which includes includes a second (for example an upper) irrigation trough 422*b*, one or more mat carriers 454*b* and a second (for example an upper) LED module 432*b* of the illumination apparatus 430, may, for example, form an upper storey 405*b*.

An irrigation apparatus 50 (not illustrated, see FIG. 1) of the apparatus 400 may include a water tank 413 arranged in a base 414 of the housing 410. The irrigation apparatus 50 may in this case be configured to feed water from the water tank 413 to the irrigation troughs 422*a*, 422*b* by means of a water circuit system (not illustrated). Furthermore, the irrigation apparatus 50 may be configured to add (not illustrated) nutrients important for plant growth to the water in the water circuit.

As illustrated in FIG. 4, the illumination apparatus 430 may, for each of the growing units 450*a*, 450*b* introduced into the accommodating space 412, respectively include one LED module 432, for example the first LED module 432*a* and the second LED module 432*b*. Here, in various embodiments, each of the LED modules 432*a*, 432*b* may be configured to emit light of a wide variety of spectral compositions. For example, the LED modules 432*a*, 432*b* may include a multiplicity of LEDs, for example three or four LEDs, wherein each of the LEDs respectively includes one color channel. In other words, the LED modules 432*a*, 432*b* may include LEDs with three or four different color channels. The LED modules 432*a*, 432*b* may however also include a different number of LEDs, for example fewer than three LEDs or more than four LEDs. Here, each LED module 432*a*, 432*b* may be configured to be dimmed, or in other words regulated or varied, between 0% and 100%. Alternatively, each of the LEDs may be configured to be dimmed, or in other words regulated or varied, individually between 0% and 100%, for example by means of pulse width modulation (PWM) or by means of the applied voltage.

Each LED module 432*a*, 432*b* may for example include at least one LED which emits light in the blue range of the spectrum, for example in a range from approximately 430 nm to approximately 490 nm, for example in a range from approximately 440 nm to approximately 475 nm, for example in a range from approximately 450 nm to 460 nm. Furthermore, each LED module 432*a*, 432*b* may for example include at least one LED which emits light in the red range of the spectrum, for example in a range from approximately 640 nm to approximately 700 nm, for example in a range from approximately 650 nm to approximately 680 nm, for example in a range from approximately 660 nm to 670 nm. Furthermore, each LED module 432*a*, 432*b* may for example include at least one LED which emits light in the dark red range of the spectrum, for example in a range from approximately 700 nm to approximately 780 nm, for example in a range from approximately 720 nm to approximately 760 nm, for example in a range from approximately 730 nm to 740 nm. Furthermore, each LED module 432a, 432b may for example include at least one LED which emits light in a composition of the spectrum such that white light is emitted.

Here, each of the LED modules 432a, 432b may include a different number of LEDs of the respective wavelength. For example, each LED module 432a, 432b for illuminating the accommodating space of the apparatus or for illuminating the plants introduced into the accommodating space may include one LED which emits light with a wavelength of 450 nm, one LED which emits light with a wavelength of 660 nm, one LED which emits light with a wavelength of 730 nm, and one LED which emits white light, for example in a composition such that white light with a peak in the green range is emitted. Alternatively, each of the LED modules 432a, 432b may for example include one LED which emits light with a wavelength of 450 nm, two LEDs which emit light with a wavelength of 660 nm, one LED which emits light with a wavelength of 730 nm, and one LED which emits white light, for example in a composition such that white light with a peak in the green range is emitted, for illuminating the accommodating space of the apparatus or for illuminating the plants introduced into the accommodating space. Here, the LED modules 432a, 432b may however also include another respective number of LEDs of the various wavelengths. Furthermore, other LED modules 432 with LEDs which emit light of other wavelengths may be provided if this is beneficial to the germination of the seeds introduced into the accommodating space or to the growth of the plants which grow from said seeds.

In various embodiments, the controller may be configured to actuate each of the LED modules 432a, 432b such that an illumination duration (or illumination time period), an illumination intensity and a composition of the illumination spectrum, or in other words a composition of the emitted wavelength ranges, is regulated, or in other words controlled or adjusted or varied.

In various embodiments, for the growing of plants, the apparatus 400 may be configured such that seed mats (not illustrated) which include seeds (not illustrated) are introduced into the accommodating space 412. Alternatively, the seed mats may include already-germinated plants (not illustrated), and the apparatus 400 may be configured for accommodating the seed mats with the germinated plants in the accommodating space. For this purpose, the mat carriers 454a, 454b may be configured such that the seed mats are placed onto the mat carriers 454a, 454b. The apparatus 400 may be configured to feed water and nutrients to the seeds, or to the plants which grow from said seeds, by means of the irrigation troughs 422a, 422b, arranged below the mat carriers 454a, 454b, of the irrigation apparatus (not illustrated). Furthermore, the apparatus 400 may be configured to irradiate the seeds, or the plants which grow from said seeds, by means of the LED modules 432a, 432b of the illumination apparatus 430. For example, the LED modules 432a, 432b may be configured to emit light of a spectral composition which is beneficial to the growth of the respective plants arranged in the corresponding growing unit 450a, 450b.

Furthermore, in various embodiments, the climate control device 440 may include an LED cooling blower 434 for each of the LED modules 432a, 432b. For example, each of the LED cooling blowers 434 may be configured to dissipate heat that is radiated by the respective LED module 432. The climate control device 440 may for example include, for the first growing unit 450a in the lower storey 405a, a first LED cooling blower (not illustrated) which is configured to cool the first LED module 432a. Furthermore, the climate control device 440 may for example include, for the second growing unit 450b in the upper storey 405b, a second LED cooling blower 434b which is configured to cool the second LED module 432b.

As has already been described in detail above with reference to FIG. 3, in various embodiments, the apparatus 400 is configured to control the irrigation apparatus 20 (not illustrated, see FIG. 1), the illumination apparatus 430 and the climate control device 440 of the apparatus 400 by means of the program controller of the controller 60 (not illustrated, see FIG. 1). For example, the controller 60 may be configured to regulate an interior space climate prevailing in the accommodating space 412 by means of the climate control device 440 on the basis of the sensor values determined by means of corresponding sensors (not illustrated) for the air humidity and for the air temperature. In various embodiments, the controller 60 may be configured to regulate a microclimate prevailing in the respective storey 405a, 405b by means of the climate control device 440 on the basis of the sensor values determined for the air humidity and for the air temperature of the respective storey 405a, 405b.

The controller 60 of the apparatus for growing plants 400 is likewise configured in the same way as the controller 60 of the apparatus 300 as described in detail with reference to FIG. 3. A more detailed description of the controller 60 of the apparatus 400 will therefore not be given here. Also, with regard to a more detailed description of the method carried out by means of the controller 60 of the apparatus 400 for regulating the interior space climate in the accommodating space 412 or the microclimate in each of the storeys 405a, 405b, reference is made to the explanations relating to FIG. 3 and to the explanations relating to FIG. 8.

Figure 5:
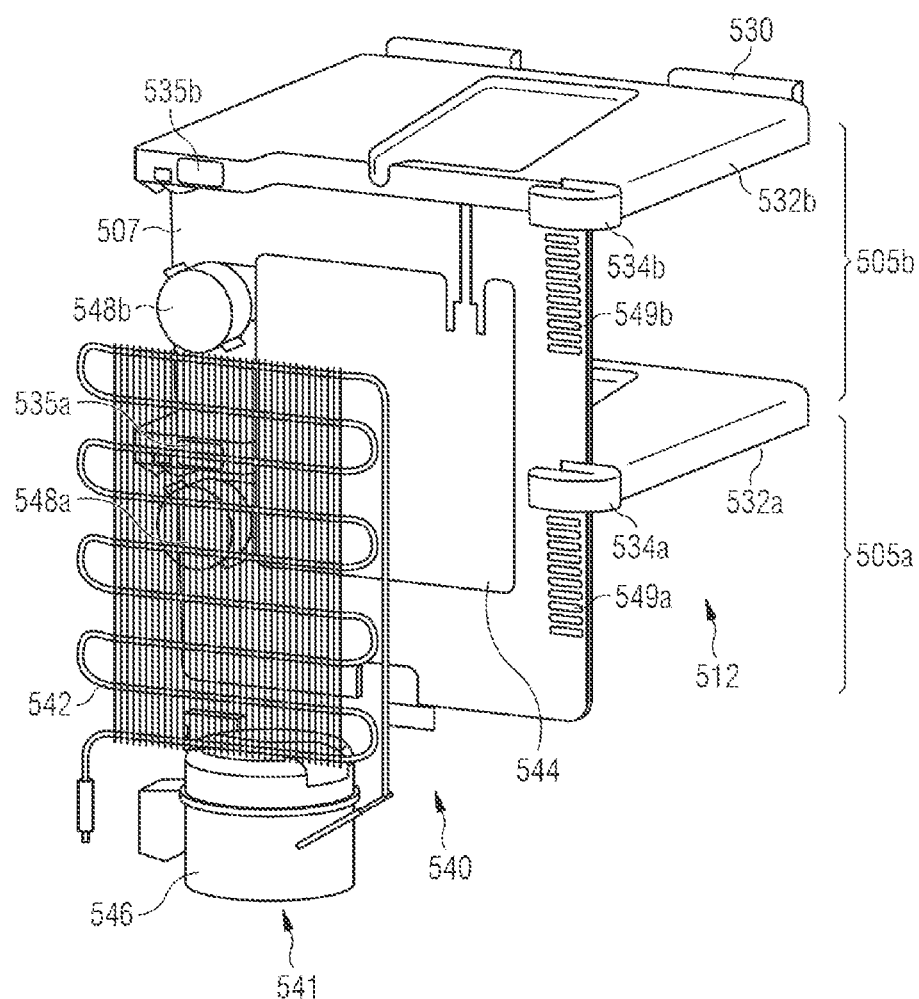
FIG. 5 shows an illustration of a climate control device according to various embodiments.

FIG. 5 is an illustration of the climate control device according to various embodiments. It is to be noted that, in the illustration of the climate control device 540 of FIG. 5, a housing (see housing 410 of the apparatus 400 illustrated in FIG. 4) of the apparatus for growing plants has been omitted for the sake of simplicity.

As illustrated in FIG. 5, in various embodiments, the climate control device 540 may include a cooling appliance 541, wherein the cooling appliance 541 may include a condenser 542, an evaporator 544 and a compressor 546. Here, the condenser 542, the evaporator 544 and the compressor 546 may for example be arranged, so as to be separated from an accommodating space 512, by means of a rear side plate 507 on a rear side of the apparatus for growing plants.

In various embodiments, the climate control device 540 may be configured to lower the air temperature in the accommodating space (not illustrated) of the apparatus by means of the cooling appliance 541. Furthermore, in various embodiments, the climate control device 540 may be configured to regulate the air humidity in the accommodating space by means of the evaporator 544.

Furthermore, in various embodiments, the climate control device 540 may include one or more cooling blowers 548. For example, the climate control device 540 may include a cooling blower 548 for each storey 505a, 505b of the apparatus for growing plants. For example, the climate control apparatus 540 may include a first cooling blower 548a which is configured to generate circulation by pumping of the air in the lower storey 505a. Furthermore, the climate control device 540 may include a second cooling blower 548b which is configured to generate circulation by pumping of the air in the upper storey 505b.

As can be seen from FIG. 5, the cooling blowers 548a, 548b may be arranged at a rear side of the apparatus on the rear side plate 507 such that they draw air out of the accommodating space 512. Here, the cooling blowers 548a, 548b may for example be arranged to the side of the evaporator 544. In various embodiments, air inlet openings 549 may be arranged at the other side of the evaporator 544. For example, the rear side plate 507 of the apparatus may include the air inlet openings 549, wherein the rear side plate 507 may include first air inlet openings 549a and second air inlet openings 549b. Here, the first cooling blower 548a may for example be designed to draw air out of the accommodating space 512 in the region of the lower storey 505a and conduct said air past the evaporator 544. The second cooling blower 548b may be configured to draw air out of the accommodating space 512 in the region of the upper storey 505b and conduct said air past the evaporator 544.

The air inlet openings 549a, 549b may be configured to cause the air that has been conducted past the evaporator 544 to then flow back again into the accommodating space 512. For example, the first air inlet openings 549a may be configured to cause the air that has been conducted past the evaporator 544 to flow back into the region of the lower storey 505a of the accommodating space 512. The second air inlet openings 549b may be configured to cause the air that has been conducted past the evaporator 544 to flow back into the region of the upper storey 505b of the accommodating space 512.

Figure 6B:
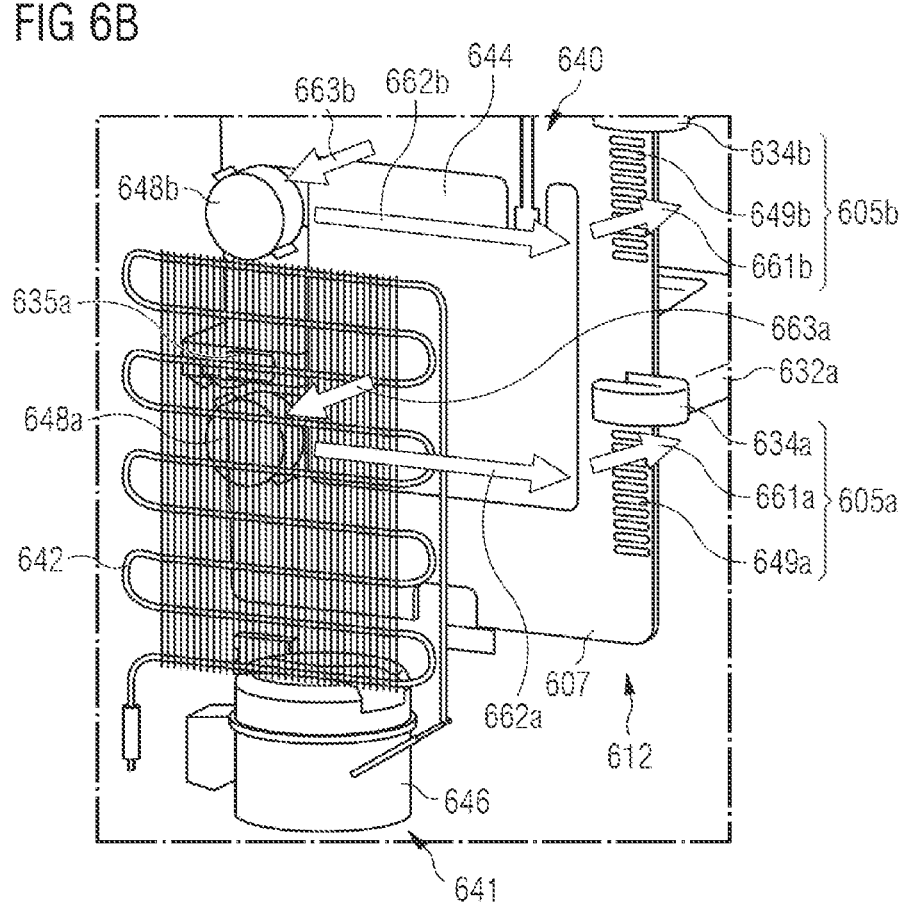
FIG. 6B shows a further illustration for explaining the air movement for the climate control of the accommodating space of the apparatus for growing plants according to various embodiments.
Figure 6C:
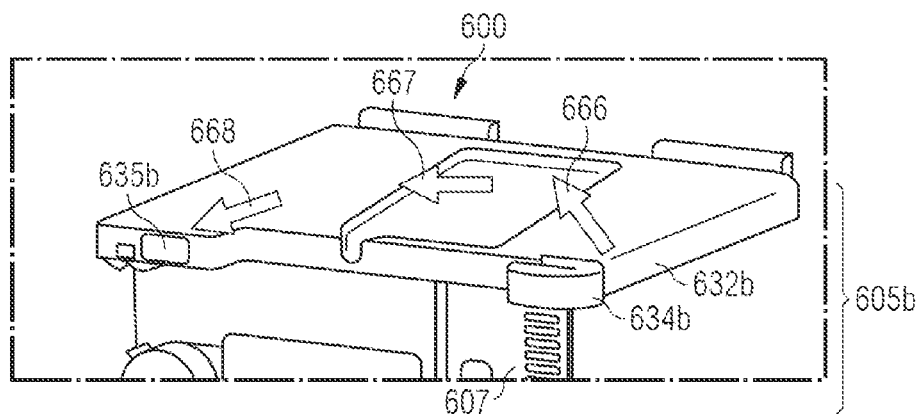
FIG. 6C shows a further illustration for explaining the air movement for the climate control of the accommodating space of the apparatus for growing plants according to various embodiments.

FIG. 6A is an illustration for explaining the air movement for the climate control of an accommodating space of the apparatus for growing plants according to various embodiments. FIG. 6B is a further illustration for explaining the air movement for the climate control of an accommodating space of the apparatus for growing plants according to various embodiments. FIG. 6C is a further illustration for explaining the air movement for the climate control of an accommodating space of the apparatus for growing plants according to various embodiments. Here, the illustration of FIG. 6A shows the air movements for the climate control of the accommodating space of the apparatus in a semi-frontal view, whereas the illustration of FIG. 6B shows the air movements for the climate control of the accommodating space of the apparatus in a rear-side detail view, and the illustration of FIG. 6C shows a detail illustration of particular air movements.

For a simpler explanation of the air movements that occur during the climate control of the accommodating space, the same reference symbols have been used in all three illustrations. It is to be noted that not all elements are visible or illustrated in all of the illustrations of FIG. 6A, FIG. 6B and FIG. 6C. For example, only FIG. 6A illustrates that the apparatus for growing plants 600 includes a housing 610 with a base 614, which is configured to accommodate a water tank 613, and includes an accommodating space 612, which is configured to accommodate irrigation troughs 622a, 622b, wherein, for the sake of simplicity of the illustration, the housing 610 is illustrated in cross section, wherein a front of the housing 610 and a side wall of the housing 610 have been omitted. On the other hand, only the detail view of FIG. 6B illustrates that a climate control device 40 (not illustrated, see FIG. 1) includes a cooling appliance 641, wherein the cooling appliance 641 includes a condenser 642, an evaporator 644 and a compressor 646. On the other hand again, the detail view of FIG. 6C illustrates only a part of the region of the upper storey 605b of the apparatus 600.

The climate control device may include one or more cooling blowers (not illustrated in FIG. 6A; see cooling blowers 548a, 548b in FIG. 5), wherein the cooling blowers may, as stated with reference to the cooling blowers 548 of FIG. 5, be configured to draw the air out of the accommodating space 612 of the apparatus 600 (see arrows 661a, 661b), as illustrated in FIG. 6A. In various embodiments, the one or more cooling blowers may be provided on a rear side plate 607 such that the one or more cooling blowers are arranged between the rear side plate 607 and a rear side wall 606 of the apparatus 600.

For example, the climate control device may include a first cooling blower and a second cooling blower. Here, the first cooling blower may for example be arranged so as to draw the air out of an accommodating space 612 in the region of a lower-storey 605a (arrow 661a). Likewise, the second cooling blower may for example be arranged so as to draw the air out of an accommodating space 612 in the region of an upper storey 605b (arrow 661b). In other words, the first cooling blower may for example be configured to draw the air out of the accommodating space 612 in the region of the lower storey 605a (arrow 661a), whereas the second cooling blower may for example be configured to draw the air out of the accommodating space 612 in the region of the upper storey 605b (arrow 661b).

As discussed with reference to FIG. 5, the climate control device may furthermore include a cooling appliance 641 (see FIG. 6B), which in turn may include a condenser 642, an evaporator 644 and a compressor 646 (only partially illustrated in the view of FIG. 6A). Here, the condenser 642, the evaporator 644 and the compressor 646 may for example be arranged on a rear side wall 606 of the housing 610 such that the evaporator 644 is arranged between the rear side wall 606 and the rear side plate 607, whereas the condenser 642 is arranged on an outer surface of the rear side wall 606 and the compressor 646 is arranged in the region of the base 614.

By means of the specific arrangement of the evaporator 644 between the rear side plate 607 and the rear side wall 606 of the housing 610, the climate control device may for example be configured to conduct the air that is drawn out of the accommodating space 612 by the cooling blowers through between the rear side plate 607 and the rear side wall 606 (arrows 662a, 662b). Here, the apparatus 600 may furthermore be configured to conduct the air that is drawn out of the accommodating space 612 by means of the cooling blowers past the evaporator 644 (arrows 662a, 662b).

More specifically, the climate control device may be configured to conduct the air that is drawn out of the region of the lower storey 605a by means of the first cooling blower (arrow 661a) and the air that is drawn out of the region of the upper storey 605b by means of the second cooling blower (arrow 661b) through the space between the rear side wall 606 and the rear side plate 607, and in the process past the evaporator 644 (arrows 662a, 662b).

As already described with reference to FIG. 5, in various embodiments, the rear side plate 607 may include one or more air inlet openings 649 on a side which is situated opposite a side at which the cooling blowers 548a, 548b are arranged. For example, the rear side plate 607 may include first air inlet openings 649a and second air inlet openings 649b. Here, the first air inlet openings 649a may for example be arranged so as to connect the space between the rear side wall 606 and the rear side plate 607 to the region of the lower storey 605a of the accommodating space 612. The second air inlet openings 649b may for example be arranged so as to connect the space between the rear side wall 606 and the rear side plate 607 to the region of the upper storey 605b of the accommodating space 612.

In this way, the apparatus 600 may be configured to conduct the air flowing past the evaporator 644 (arrows 662a, 662b) back into the accommodating space 612 via the air inlet openings 649a, 649b (arrows 663a, 663b). For example, the first air inlet openings 649a may be configured to conduct the air flowing past the evaporator 644 back into the region of the lower storey 605a (arrow 663a), and the second air inlet openings 649b may be configured to conduct the air flowing past the evaporator 644 back into the region of the upper storey 605b (arrow 663b).

In various embodiments, the controller 60 (not illustrated, see FIG. 1) of the apparatus 600 may be configured to actuate the climate control device 40 (not illustrated, see FIG. 1) such that the air flowing past the evaporator 644 (arrows 662a, 662b) is cooled as it flows past. For example, the controller may be configured to actuate the climate controller such that the cooling blowers cause such a quantity of air to flow past the evaporator 644 (arrows 662a, 662b) that the temperature of the air in the accommodating space 612 is lowered. In other words, the controller may actuate the climate control device such that the temperature of the air that is conducted back into the accommodating space 612 via the air inlet openings 649a, 649b (arrows 663a, 663b) is regulated. For example, the controller may actuate the climate control device such that the temperature of the air that is conducted back into the accommodating space 612 via the air inlet openings 649a, 649b (arrows 663a, 663b) is set to a temperature beneficial to the growth of the plants introduced into the accommodating space.

Furthermore, in various embodiments, the controller 60 of the apparatus 600 may be configured to actuate the climate control device such that a content of air humidity in the air flowing past the evaporator 644 (arrows 662a, 662b) is lowered as said air flows past. For example, the controller may be configured to actuate the climate controller such that the cooling blowers cause such a quantity of air to flow past the evaporator 644 (arrows 662a, 662b) that the humidity content of the air in the accommodating space 612 is lowered. In other words, the controller may actuate the climate control device such that the air humidity of the air that is conducted back into the accommodating space 612 via the air inlet openings 649a, 649b (arrows 663a, 663b) is regulated. For example, the controller may actuate the climate control device such that the air humidity of the air that is conducted back into the accommodating space 612 via the air inlet openings 649a, 649b (arrows 663a, 663b) is set to an air humidity content beneficial to the growth of the plants introduced into the accommodating space.

As discussed, in various embodiments, the climate control device, actuated by the controller, may be configured to lower the content of air humidity in the air present (or located) in the accommodating space 612 by means of the evaporator 644. For this purpose, the climate control device may be configured to conduct such a quantity of air from the accommodating space 612 past the evaporator 644 (arrows 662a, 662b), and at the same time cool the evaporator 644 to such an extent, that a part of the water present (or located) in the air condenses on the evaporator 644. In this way, the content of air humidity in the accommodating space 612 may be lowered.

On the other hand, in various embodiments, the irrigation unit 20 (not illustrated, see FIG. 1), actuated by the controller, may be configured to feed water to the irrigation troughs 622a, 622b by means of a water circuit system, as described with reference to FIG. 2. Here, the irrigation unit, actuated by the controller, may be configured to fill the irrigation troughs 622a, 622b for example at regular intervals, wherein water may evaporate. This may cause the content of air humidity in the accommodating space 612 to be increased.

The apparatus for growing plants 600 may furthermore be configured to cause water that condenses on the evaporator 644 as the air flows past (arrows 662) to run off and to collect said water in the water tank of the irrigation apparatus (see for example water tank 613 in FIG. 6A), such that said condensed water is fed (not illustrated) to the water circuit system of the irrigation apparatus.

In various embodiments, the apparatus for growing plants 600 may furthermore include an apparatus for purifying the air (not illustrated) in the accommodating space. In other words, the apparatus 600 may be configured to purify the air in the accommodating space 612. For example, the apparatus for growing plants 600 may be configured to purify the air in the accommodating space by irradiation with light in the UV-C range. For this purpose, the apparatus 600 may for example be configured to conduct the air that is pumped out of the accommodating space 612 (arrows 661a, 661b) through a suitable pipe (not illustrated), for example a UV-permeable pipe composed of quartz glass (not illustrated), and in the process irradiate said air with light in the UV-C range such that, in the process, germs that are present in the air pumped out of the accommodating space 612, for example fungi, fungal spores and/or bacteria, are killed. In other words, the apparatus 600 may be configured to sterilize the air that is pumped out of the accommodating space 612 (arrows 661a, 661b) by irradiation with light in the UV-C range before said air is conducted back into the accommodating space 612 through the inlet openings 649a, 649b (arrows 663a, 663b).

Referring again to FIG. 5, in various embodiments, each of the storeys 505a, 505b may, as already described above with reference to FIG. 2 to FIG. 4, respectively include one LED module 532 of the illumination apparatus 530. For example, the lower storey 505a may include a first (for example a lower) LED module 532a, as illustrated in FIG. 5. Likewise, the upper storey 505b may include a second (for example an upper) LED module 532b. Each of the LED modules 532a, 532b may, as described with reference to FIG. 4 for the LED modules 432a, 432b, include a multiplicity of LEDs. Each of the LED modules 532a, 532b may furthermore have the same characteristics as described in detail with reference to FIG. 4 for the LED modules 432a, 432b.

The climate control device 540 may furthermore be configured to dissipate the heat that is radiated by the LED modules 532a, 532b. For this purpose, the climate control device 540 may include one or more LED cooling blowers 534 and one or more LED air outlet openings 535. For example, the climate control device 540 may include a first LED cooling blower 534a and a first LED air outlet opening 535a. Here, the first LED cooling blower 534a and the first LED air outlet opening 535a may be configured to dissipate the heat that is generated by the first LED module 532a in the lower storey 505a. Likewise, the climate control device 540 may include a second LED cooling blower 534b and a second LED air outlet opening 535b. Here, the second LED cooling blower 534b and the second LED air outlet opening 535b may be configured to dissipate the heat that is generated by the second LED module 532b in the upper storey 505b.

For this purpose, the first LED cooling blower 534a and the second LED cooling blower 534b may be configured to draw ambient air in from rear-side surroundings of the apparatus for growing plants and to conduct said ambient air past the first LED module 532a and the second LED module 532b. For example, the LED cooling blowers 534a, 534b may be configured to draw ambient air in and conduct it past cooling fins (not illustrated) arranged over the LED modules 532a, 532b such that heat that is generated by the LED modules 532a, 532b is dissipated.

Referring again to FIG. 6A to FIG. 6C, in various embodiments, each of the storeys 605a, 605b accordingly may respectively include an LED module 632 of the illumination apparatus, as already described above with reference to FIG. 2 to FIG. 5. For example, the lower storey 605a may include a first (for example a lower) LED module 632a, as illustrated in FIG. 6A and FIG. 6B. Likewise, the upper storey 605b may include a second (for example an upper) LED module 632b, as illustrated in FIG. 6A and FIG. 6C. It is to be noted here that, in the partial or detail views of FIG. 6B and FIG. 6C, either only the first LED module 632a of the lower storey 605a is illustrated (FIG. 6B) or only the second LED module 632b of the upper storey 605b is illustrated (FIG. 6C).

Here, as described with reference to FIG. 4 for the LED modules 432a, 432b, each of the LED modules 632a, 632b may include a multiplicity of LEDs. Each of the LED modules 632a, 632b may furthermore include the same characteristics as described in detail with reference to FIG. 4 for the LED modules 432a, 432b.

The climate control device may be configured to dissipate the heat that is radiated by the LED modules 632a, 632b. For this purpose, the climate control device may include one or more LED cooling blowers 634 and one or more LED air outlet openings 635. For example, the climate control device may include a first LED cooling blower 634a and a first LED air outlet opening 635a. Here, the first LED cooling blower 634a and the first LED air outlet opening 635a may be configured to dissipate the heat that is generated by the first LED module 632a in the lower storey 605a. Likewise, the climate control device may include a second LED cooling blower 634b and a second LED air outlet opening 635b. Here, the second LED cooling blower 634b and the second LED air outlet opening 635b may be configured to dissipate the heat that is generated by the second LED module 632b in the upper storey 605b.

As illustrated in FIG. 6C, the second LED cooling blower 634b may be configured to feed air to the second LED module 632b (arrow 666) such that the fed air flows past the second LED module 632b (arrow 667), wherein the second LED cooling blower 634b may be configured to feed outside air to the second LED module 632b (arrow 666). Furthermore, the second LED air outlet openings 635b may be configured to conduct the air that flows past the second LED module 632b (arrow 667) onward (arrow 668), wherein the second LED air outlet openings may be configured to release the air that flows past the second LED module 632b (arrow 667) to the outside (arrow 668). Here, the heat that is generated by the second LED module 632b may be dissipated by means of the fed air that flows past and is conducted onward (arrows 666, 667 and 668), wherein the heat may be dissipated to the outside by means of the air that is conducted onward (arrow 668).

Likewise, as described here for the second LED module 632b, the first LED cooling blower 634a (see FIG. 6B) and the first LED air outlet openings 635a may be configured to dissipate the heat that is generated by the first LED module 632a in the region of the lower storey 605a. For this purpose, the first LED cooling blower 634a and the first LED air outlet openings 635a may be configured to generate, in the region of the first LED module 632a, corresponding air flows (not illustrated) by means of which the heat that is generated by the LED module 632a is dissipated. In other words, the heat that is generated by the first LED module 632a may be dissipated by means of corresponding air flows, generated by means of the first LED cooling blower 634a and the first LED air outlet openings 635a, in the region of the first LED module 632a or of the lower storey 605a.

For the dissipation of excess heat, as already described, the first LED cooling blower 634a and the second LED cooling blower 634b may be configured to draw ambient air in from rear-side surroundings of the apparatus for growing plants and to conduct said ambient air past the first LED module 632a and the second LED module 632b. For example, the LED cooling blowers 634a, 634b may be configured to draw ambient air in and conduct it past cooling fins (not illustrated) arranged over the LED modules 632a, 632b such that heat that is generated by the LED modules 632a, 632b is dissipated.

In various embodiments, as described with reference to FIG. 3, the climate control device of the apparatus 600 may include one or more temperature sensors (315 in FIG. 3; not illustrated in FIG. 6) and/or one or more air humidity sensors (316 in FIG. 3; not illustrated in FIG. 6). The temperature sensors and the air humidity sensors of the apparatus 600 may in this case be configured to feed determined measured values, or in other words determined sensor values, for the air temperature and the air humidity, respectively, in the accommodating space 612 to the program controller of the control device. In other words, the control device may be configured to receive determined measured values, or in other words determined sensor values, for the air temperature and the air humidity in the accommodating space 612 from the temperature sensors and the air humidity sensors of the apparatus 600.

Here, in various embodiments, as already described with reference to FIG. 3, the controller may be configured to regulate an interior space climate prevailing in the accommodating space 612 by means of the climate control device on the basis of the sensor values determined for the air humidity and for the air temperature. In various embodiments, the controller may be configured to regulate a microclimate prevailing in the respective storey 605a, 605b by means of the climate control device on the basis of the sensor values determined for the air humidity and for the air temperature of the respective storey 605a, 605b.

For example, the controller may be configured to actuate the climate control device on the basis of the sensor values of the temperature sensor and/or air humidity sensor arranged in the region of the lower storey 605a such that the microclimate prevailing in the lower storey 605a of the accommodating space 612 is regulated. Likewise, the controller may be configured to actuate the climate control device on the basis of the sensor values of the temperature sensor and/or air humidity sensor arranged in the region of the upper storey 605b such that the microclimate prevailing in the upper storey 605b of the accommodating space 612 is regulated.

Here, the controller may be configured to actuate the climate control device such that a different microclimate is set in the region of the lower storey 605a than in the region of the upper storey 605b of the accommodating space 612. For example, the controller may be configured to actuate the climate control device such that a microclimate beneficial to the growth of the plants growing in the lower storey 605a is set in the region of the lower storey 605a. On the other hand, the controller may be configured to actuate the climate control device such that a microclimate beneficial to the growth of the plants growing in the upper storey 605b is set in the region of the upper storey 605b, wherein the microclimate beneficial to the growth of the plants growing in the upper storey 605b may differ from the microclimate beneficial to the growth of the plants growing in the lower storey 605a.

Accordingly, in various embodiments, the climate controller may be configured to, in accordance with the actuation based on the sensor values by the controller, regulate the air quantities flowing past the evaporator (arrows 662) by means of the cooling blowers 648 (arrows 661) and the air inlet openings (arrows 663) such that the air in the accommodating space 612 has a temperature and air humidity beneficial to the growth of the plants introduced into said accommodating space.

For example, the climate controller may be configured to, in accordance with the actuation based on the sensor values of the first temperature sensor (not illustrated; see for example reference symbol 315a in FIG. 3) and of the first air humidity sensor (not illustrated; see for example reference symbols 316a in FIG. 3) by the controller, regulate the air quantity flowing past the evaporator (arrow 662a) by means of the first cooling blower 648a (arrow 661a) and the air inlet openings 649a (arrow 663a) such that the air in the region of the lower storey 605a of the accommodating space 612 has a temperature and air humidity beneficial to the growth of the plants growing in the lower storey 605a. Likewise, the climate controller may be configured to, in accordance with the actuation based on the sensor values of the second temperature sensor 315b and of the second air humidity sensor 316b by the controller, regulate the air quantity flowing past the evaporator (arrow 662b) by means of the second cooling blower 648b (arrow 661b) and the second air inlet openings 649b (arrow 663b) such that the air in the region of the upper storey 605b of the accommodating space 612 has a temperature and air humidity beneficial to the growth of the plants growing in the upper storey 605b.

Furthermore, in various embodiments, the control device may be configured to increase the air temperature in the accommodating space 612 for example by means of a heat quantity radiated by the LED modules 632. For example, the control device may be configured to increase the air temperature in the region of the lower storey 605a by means of the heat quantity radiated by the first LED module 632a. Likewise, the control device may be configured to increase the air temperature in the region of the upper storey 605b by means of the heat quantity radiated by the second LED module 632b.

As already discussed above with reference to FIG. 5 and FIG. 6A, in various embodiments, the climate control device, actuated by the controller, may be configured to lower the content of air humidity in the air present in the accommodating space 612 by means of the evaporator 644. Furthermore, the controller may be configured to actuate the climate control device such that the air flowing past the evaporator 644 is cooled as it flows past, whereby the temperature in the accommodating space 612 may be lowered.

As described above with reference to FIG. 3, in various embodiments, the controller may be configured to actuate the irrigation apparatus, the illumination apparatus and the climate control device such that an interior space climate or microclimate adapted to the respective plants growing in the growing unit, and to the state of said plants, is produced.

For this purpose, in various embodiments, each of the seed mats (not illustrated) introduced into the accommodating space 612 of the apparatus 600 may for example include an RFID tag (not illustrated; for example an RFID transponder). The apparatus 600 may furthermore include at least one RFID antenna (not illustrated) and an RFID reading apparatus (not illustrated) for respectively receiving and reading out RFID signals of the RFID transponder. In addition or alternatively to the RFID tag, each of the seed mats may include a QR label and/or a barcode, and the apparatus may accordingly, additionally or alternatively to the RFID antennae and the RFID reading apparatus, include at least one QR code sensor and/or at least one barcode sensor and corresponding reading apparatuses which may detect and read out the QR label or the barcode of the at least one seed mat for the control of the program controller.

The controller may be configured to evaluate all signals of the RFID antennae, of the RFID reading apparatus, of the QR code sensors, of the barcode sensors and of the corresponding reading apparatuses, thereby identify the introduced seeds, and, by means of the program controller, set climate control data suitable for said seeds for the purposes of the climate control of the accommodating space. In other words, the apparatus may include at least one program sensor, wherein the program sensor is provided as an RFID sensor and/or QR code sensor and/or barcode sensor which may respectively detect RFID signals and/or a QR label and/or a barcode of the at least one seed mat for the control of the program controller. In this way, the controller may be configured to produce a microclimate adapted to the seeds in the corresponding growing unit by means of the program controller on the basis of the climate control data.

The RFID antennae (and/or the QR code sensor and/or the barcode sensor) may be arranged in the side walls of the apparatus 600, and the RFID reading apparatus (and/or the corresponding other reading apparatuses) may be arranged at a rear side of the apparatus 600. For example, one RFID antenna may respectively be arranged in a region of the accommodating space 612 corresponding to the lower storey 605a and in a region of the accommodating space 612 corresponding to the upper storey 605b. Alternatively, one RFID antenna may respectively be arranged in each of the side walls such that each of the one or more seed mats which are applied onto one mat carrier may respectively be individually identified. In other words, the apparatus 600 may be configured to identify, by means of the RFID antennae, seeds or plants which are applied onto each of the one or more seed mats which are placed onto the respective mat carrier in the lower storey 605a or in the upper storey 605b, wherein each of the seed mats includes, for this purpose, an RFID tag.

The controller may be configured to, by means of the RFID reading apparatus, read and identify the corresponding RFID transponder introduced by means of the seed mats into the accommodating space 612. Furthermore, the controller may be configured to access, from a program memory, items of information relating to the seeds introduced on the respective seed mat and identified by means of the respective RFID transponder (or relating to the plants that have germinated on the respective seed mat). For example, the controller may be configured to read out, from the program memory, items of information relating to the plant type introduced into the accommodating space 612, to the exact positioning thereof within the accommodating space 612, and to a growth phase of the plants. Furthermore, in various embodiments, the controller may be configured to read out, from the program memory, instructions relating to the interior space climate or microclimate beneficial to the further growth of the plants on the basis of the read-out information relating to the introduced plant type, the positioning thereof in the accommodating space 612 and the growth phase.

For this purpose, in various embodiments, as already discussed, the program controller of the controller may include climate control data. For example, the climate control data may, by means of the described identification of the seeds introduced into the accommodating space, be adapted individually to said seeds. In other words, the program controller may include climate control data adapted individually to seeds accommodated in the accommodating space. In this way, the controller may be configured to produce a microclimate adapted to the seeds in the corresponding growing unit by means of the program controller on the basis of the climate control data.

For the program controller, a data memory may also be provided, from which the illumination data and/or irrigation data and/or climate control data adapted individually to the seeds may be accessed. Here, the data memory may be provided as an external data memory by means of an Internet connection provided in the apparatus.

In other words, the controller may be configured to set regulating variables for the air temperature and the air humidity in the accommodating space, and output these regulating variables to the climate control device, on the basis of the read-out items of information. Furthermore, the controller may be configured to set regulating variables for an illumination intensity and an illumination duration (or illumination time period) for each of the seed mats, and output these regulating variables to the illumination apparatus, on the basis of the read-out items of information. Furthermore, the controller may be configured to set regulating variables for filling of the irrigation troughs under the respective seed mats, and output these regulating variables to the irrigation apparatus, on the basis of the read-out items of information.

The controller may additionally be configured to set regulating variables for the air temperature, the air humidity, the illumination intensity, the illumination duration (or illumination period) and the filling of the irrigation troughs with water and nutrients in each region, corresponding to a seed mat, of the accommodating space 612 on the basis of a state of the plants introduced into the accommodating space 612, and output these regulating variables to the climate control device, to the illumination apparatus and to the irrigation apparatus, on the basis of the read-out items of information. For this purpose, the apparatus for growing plants 612 may furthermore include a camera (not illustrated) for recording images of the seed mats accommodated in the accommodating space and of the plants which grow from the seeds (or which grow on the seed mats, respectively).

Furthermore, the controller may include a pattern recognition apparatus (not illustrated) and an associated pattern recognition memory (not illustrated) and be configured to receive signals from the camera and transmit said signals to the program controller. Furthermore, the controller may be configured to, by means of the pattern recognition apparatus, compare the images recorded by means of the camera with one or more reference images stored in the pattern recognition memory in order to determine a state of the plants accommodated in the accommodating space, in order to thus adapt the program controller to the respective plant and to the state of said plant. In other words, the controller may be configured to actuate the climate control device, the illumination apparatus and the irrigation apparatus such that the air temperature, the air humidity, the illumination intensity, the illumination duration (or illumination time period) and the filling of the irrigation troughs is adapted to the state of the plants growing from the seeds.

Altogether, the controller may accordingly be configured to actuate the climate control device, the illumination apparatus and the irrigation apparatus such that the air temperature, the air humidity, the illumination intensity, the illumination duration (or illumination period) and the filling of the irrigation troughs are adapted to the respective seeds and/or to the state of the plants growing from the seeds.

In various embodiments, the apparatus 600 may furthermore be configured to connect to the Internet by means of WLAN. For this purpose, the apparatus 600 may include a WLAN antenna (not illustrated), for example a WiFi antenna. For example, the WLAN antenna may be arranged in an upper cover of the apparatus 600. The controller may furthermore be configured to, via the Internet, access data stored in a cloud. For example, the controller may be configured to access data stored in the cloud relating to the seeds introduced into the accommodating space 612 or to the plants growing from said seeds.

For example, the controller may be configured to access data stored in the cloud relating to the respective requirements of the introduced plant type, to the respective growth phase thereof and/or to the state thereof with regard to the air temperature, the air humidity, the illumination intensity, the illumination duration (or illumination time period, or illumination period) and the feed of water and nutrients. Furthermore, the controller may be configured to set regulating variables for the air temperature, the air humidity, the illumination intensity, the illumination duration (or illumination period) and the filling of the irrigation troughs, and output said regulating variables to the climate control device, to the illumination apparatus and to the irrigation apparatus, on the basis of the data accessed from the cloud. Correspondingly, the controller may be configured to actuate the climate control device, the illumination apparatus and the irrigation apparatus such that the air temperature, the air humidity, the illumination intensity, the illumination duration (or illumination period) and the filling of the irrigation troughs is set in accordance with the specific requirements of the plants introduced into or growing in the accommodating space.

The apparatus 600 may furthermore be configured to transmit values determined by the sensors, for example the temperature sensors and the air humidity sensors, and images recorded by the camera, to the cloud. The sensor values and camera images transmitted to the cloud may be accessed from the cloud in order, on the basis of the sensor values and the camera images, for example to perform an evaluation of the plant growth, improve instructions to the controller and/or diagnose malfunctions.

FIG. 7 is an illustration of a housing of the apparatus for growing plants according to various embodiments.

As illustrated in FIG. 7, in various embodiments, the housing 710 of the apparatus for growing plants 700 furthermore includes a fresh-air blower 770. The fresh-air blower 770 may for example be arranged in a lower region of a side wall 703 of the apparatus 700. For this purpose, the side wall 703 may include an aperture 703a in the lower region, wherein the fresh-air blower 770 may be arranged such that it may draw air in from the surroundings of the apparatus 700 through the aperture 703a. Alternatively, the fresh-air blower 770 may for example be arranged in a base region 714 of a front side of the apparatus 700 (not illustrated).

The fresh-air blower 770 may be configured to be actuated by the controller 60 (not illustrated; see FIG. 1) by means of the climate control device 40 (not illustrated; see FIG. 1). The controller may be configured to actuate the climate control device such that fresh air is pumped by means of the fresh-air blower 770 from surroundings of the apparatus 700 into the accommodating space 712 of the apparatus 700. In other words, the control device may be configured to actuate the fresh-air blower 770 such that ambient air is blown into the accommodating space 712.

The apparatus 700 may furthermore include air outlet openings 772. The air outlet openings 772 may for example be arranged in an upper region of the accommodating space 712. For example, the air outlet openings 772 may be arranged on a top panel 708 of the housing 710. The air outlet openings 772 may be configured to allow air to flow out of the accommodating space 712 to the outside. Here, the air outlet openings 772 may be configured to prevent a positive pressure from forming in the accommodating space 712.

The apparatus 700 may furthermore include at least one activated carbon filter 771 which is configured to filter the air that is drawn in from the surroundings by means of the fresh-air blower 770. The at least one activated carbon filter 771 may for example be arranged between the fresh-air blower 770 and the accommodating space 712. Here, the at least one activated carbon filter 771 may be configured to filter dust and other particles out of the ambient air such that these do not pass into the accommodating space 712 of the apparatus.

Furthermore, the apparatus may include further activated carbon filters 773, which are arranged at the air outlet openings 772. The activated carbon filters 773 at the air outlet openings 772 may be configured to filter the air flowing out of the accommodating space 712, such that any odors that are possibly generated in the accommodating space 712 are not released into the surroundings.

Furthermore, in various embodiments, the apparatus 700 may include a temperature sensor 718 for determining an ambient temperature. The ambient temperature sensor 718 may for example likewise be arranged in the aperture 703*a* of the side wall 703. Alternatively, the ambient temperature sensor 718 may for example be arranged in the base region 714 of the front side of the apparatus 700 (not illustrated).

In various embodiments, the controller may be configured to actuate the fresh-air blower 770 such that fresh air from the surroundings is fed to the accommodating space 712. The controller may for example be configured to actuate the fresh-air blower 770 such that fresh air from the surroundings is fed to the accommodating space 712 at preset times, for example at preset times of the day. Alternatively, the controller may be configured to actuate the fresh-air blower 770 such that fresh air from the surroundings is fed to the accommodating space 712 at regular intervals.

Furthermore, in various embodiments, the controller may be configured to actuate the fresh-air blower 770 such that fresh air is fed to the accommodating space 712 if the $CO_2$ content in the accommodating space 712 becomes too high. For this purpose, the apparatus 700 may additionally include a $CO_2$ sensor 717 for determining a $CO_2$ content of the air in the accommodating space 712. The $CO_2$ sensor 717 may be arranged in the side wall 703 of the housing 710. For example, the $CO_2$ sensor 717 may be arranged together with, or in other words in the vicinity of, the temperature sensor 316*b* and the air humidity sensor 315*b* (see FIG. 3) in the region of the upper storey 305*b* of the accommodating space on an inner side of the side wall 703. Alternatively, the air humidity sensor, the temperature sensor and the $CO_2$ sensor 717 may be designed, or in other words formed, as a combined air humidity-temperature-$CO_2$ sensor 717.

The controller may be configured to receive sensor data from the $CO_2$ sensor 717. Furthermore, the controller may be configured to actuate the fresh-air blower 770 by means of the climate control device on the basis of the data received from the $CO_2$ sensor 717, for example on the basis of measured values received from the $CO_2$ sensor 717, such that the $CO_2$ content of the air in the accommodating space 712 does not exceed a preset value.

FIG. 8 shows a flow diagram of a method for growing plants according to various embodiments.

As illustrated in FIG. 8, in various embodiments, the method for growing plants includes introducing one or more seed mats into an accommodating space of an apparatus for growing plants, 810, actuating an irrigation apparatus, an illumination apparatus and a climate control device of the apparatus for growing plants by means of a program controller of a controller, 820, determining an air humidity in the accommodating space by means of at least one air humidity sensor, 830, and determining an air temperature in the accommodating space by means of at least one temperature sensor, 840.

Here, in various embodiments, the method may furthermore include feeding measured values from the air humidity sensor and/or from the temperature sensor to the controller. In other words, the controller may receive measured values determined by means of the sensors, or in other words sensor values determined by means of the sensors for the air humidity and/or for the air temperature, that is to say by means of the air humidity sensor and/or by means of the temperature sensor.

Furthermore, the method may include regulating an interior space climate prevailing in the accommodating space by means of the climate control device by means of the controller. For example, the method may include regulating, by means of the controller, an interior space climate prevailing in the accommodating space by means of the climate control device on the basis of the sensor values determined for the air humidity and for the air temperature. Here, the controller may for example regulate the air temperature on the basis of the determined temperature sensor values. Furthermore, the controller may regulate the air humidity on the basis of the determined air humidity values.

For example, the air temperature and/or the air humidity in the accommodating space may be adjusted by means of a cooling appliance of the climate control device by actuation of the controller, wherein the cooling appliance optionally includes an evaporator. The controller may for example lower the air temperature in the accommodating space by means of the cooling appliance. In other words, the controller may cool the air in the accommodating space by means of the cooling appliance.

On the other hand, the controller may increase the air temperature in the accommodating space by means of a light quantity radiated by the illumination apparatus. For example, the controller may increase the air temperature in the accommodating space by means of a heat quantity radiated by the illumination apparatus. In other words, the controller may actuate the illumination apparatus such that the air temperature in the accommodating space is increased by means of a heat quantity radiated by the illumination apparatus in addition to the light, in other words by means of heat energy radiated by the illumination apparatus.

The illumination apparatus may emit light by means of an LED module for each of the growing units introduced into the accommodating space. Here, each of the LED modules may emit light of a wide variety of spectral compositions. For example, the LED modules may, by means of a multiplicity of LEDs, for example three or four LEDs, wherein each of the LEDs respectively includes one color channel, emit light of the corresponding color. In other words, the LED modules may, by means of the LEDs, emit light in for example three or four different color channels. Here, each LED module may be dimmed, or in other words regulated or varied, between 0% and 100%. Alternatively, each of the LEDs may be dimmed, or in other words regulated or varied, individually between 0% and 100%, for example by means of pulse width modulation (PWM) or by means of the applied voltage.

Each LED module may for example, by means of at least one LED, emit light in the blue range of the spectrum, for example in a range from approximately 430 nm to approximately 490 nm, for example in a range from approximately 440 nm to approximately 475 nm, for example in a range from approximately 450 nm to 460 nm. Furthermore, each LED module may for example, by means of at least one LED, emit light in the red range of the spectrum, for example in a range from approximately 640 nm to approximately 700 nm, for example in a range from approximately 650 nm to approximately 680 nm, for example in a range from approximately 660 nm to 670 nm. Furthermore, each LED module may for example, by means of at least one LED, emit light in the dark red range of the spectrum, for example in a range from approximately 700 nm to approximately 780 nm, for example in a range from approximately 720 nm to approximately 760 nm, for example in a range from approximately 730 nm to 740 nm. Furthermore, each LED module may for example, by means of at least one LED, emit light in a composition of the spectrum such that white light is emitted.

Here, each of the LED modules may emit light by means of a different number of LEDs of the respective wavelength. For example, each LED module may emit light for illuminating the accommodating space of the apparatus, or for illuminating the plants introduced into the accommodating space, by means of at least one LED which emits light with a wavelength of 450 nm, at least one LED which emits light with a wavelength of 660 nm, at least one LED which emits light with a wavelength of 730 nm, and at least one LED which emits white light, for example in a composition such that white light with a peak in the green range is emitted. Alternatively, each of the LED modules may for example emit light for illuminating the accommodating space of the apparatus, or for illuminating the plants introduced into the accommodating space, by means of one LED which emits light with a wavelength of 450 nm, two LEDs which emit light with a wavelength of 660 nm, one LED which emits light with a wavelength of 730 nm, and one LED which emits white light, for example in a composition such that white light with a peak in the green range is emitted. Here, the LED modules may however also emit light by means of a different respective number of LEDs of the different wavelengths. Furthermore, other LED modules with LEDs which emit light of other wavelengths may be used if this is beneficial to the germination of the seeds introduced into the accommodating space or to the growth of the plants which grow from said seeds.

In various embodiments, the controller may actuate each of the LED modules such that an illumination duration (or illumination period), an illumination intensity and a composition of the illumination spectrum, or in other words a composition of the emitted wavelength ranges, is regulated, or in other words controlled or adjusted or varied.

In the method for growing plants, furthermore, in various embodiments, the air humidity in the accommodating space may be regulated. For example, the controller may regulate the air humidity in the accommodating space by means of the evaporator. For example, the controller may actuate the climate control device such that the air humidity is lowered by means of the evaporator. On the other hand, the controller may actuate the climate control device such that the air humidity increases, wherein the air humidity increases by evaporation of water which is fed by means of the irrigation apparatus to the plants arranged in the accommodating space. Furthermore, water at the roots and in the leaves of the plants growing in the accommodating space may evaporate and may be released by means of the photosynthesis activity and the respiration of the plants growing in the accommodating space.

In the method for growing plants, furthermore, water which condenses as the air flows past the evaporator may run off and be collected in the water tank of the irrigation apparatus, such that said condensed water is fed to the water circuit system of the irrigation apparatus.

In various embodiments, the method for growing plants may furthermore include purifying the air in the accommodating space. In other words, in the method, the air in the accommodating space may be purified. For example, the air in the accommodating space may be purified by irradiation with light in the UV-C range. For this purpose, the air pumped out of the accommodating space (see arrows 661*a*, 661*b* in FIG. 6) may be conducted through a suitable pipe, for example a UV-permeable pipe composed of quartz glass, and in the process irradiated with light in the UV-C range such that, in the process, germs that are present in the air pumped out of the accommodating space, for example fungi, fungal spores and/or bacteria, are killed. In other words, in the method for growing plants, the air that is pumped out of the accommodating space (see arrows 661*a*, 661*b* in FIG. 6) may be sterilized by irradiation with light in the UV-C range before said air flows back into the accommodating space through the inlet openings (see arrows 663*a*, 663*b* in FIG. 6).

In various embodiments, the method may furthermore include cooling air present in the accommodating space by means of at least one cooling blower of the climate control device. For example, the controller may actuate the climate control device such that the air present (or located) in the accommodating space is cooled by means of the cooling blower. As already discussed with reference to FIG. 6A, the air present in the accommodating space may, for this purpose, be drawn out of the accommodating space by means of the cooling blower. The air may then be conducted past the evaporator arranged on a rear side wall of the apparatus and conducted via specific air inlet openings back into the accommodating space, wherein the air that flows past the evaporator is cooled such that the air conducted back into the accommodating space is cooler than the air drawn out of the accommodating space.

Furthermore, in various embodiments, the method may include introducing one or more growing units into the accommodating space, wherein each growing unit forms a storey in the accommodating space, and wherein each growing unit includes an irrigation trough, at least one LED module and one or more mat carriers, and placing one or more seed mats onto each of the mat carriers, wherein each of the seed mats includes seeds (or already-germinated plants).

In other words, in the method for growing plants, it is furthermore possible for one or more growing units to be introduced into the accommodating space. Here, each of the growing units may include an irrigation trough, at least one LED module and one or more mat carriers, and may be arranged in the accommodating space such that one storey in the accommodating space is respectively formed by each of the growing units. For example, a lower growing unit with a first (for example a lower) irrigation trough, a first (for example a lower) LED module and one or more mat carriers may be arranged in the accommodating space so as to form a lower storey. Furthermore, an upper growing unit with a second (for example an upper) irrigation trough, a second (for example an upper) LED module and one or more mat carriers may be arranged in the accommodating space so as to form an upper storey.

In various embodiments, one or more seed mats may be placed onto each of the mat carriers. Here, each of the seed mats may include seeds, wherein plants may grow from the seeds. Alternatively, the seed mats may include already-germinated plants, and may be introduced with the germinated plants into the accommodating space. Here, the controller may actuate the climate control device such that an interior space climate conducive to plant growth is set in the accommodating space or in the region of each storey.

In the method for growing plants, the air in each storey may be cooled by means of a separate cooling blower. In other words, the air temperature in the accommodating space may be individually regulated in the region of each storey by means of the controller. For example, the controller may actuate the cooling blower for the lower storey such that the air temperature in the region of the lower storey is lowered. Likewise, the controller may actuate the cooling blower for the upper storey such that the air temperature in the region of the upper storey is lowered. In this way, the air temperature in the region of the individual storeys may be separately regulated by means of the climate control device actuated by the controller.

Furthermore, each LED module may be cooled by means of a separate LED cooling blower. For example, the lower LED module may be cooled by means of the lower LED cooling blower. Furthermore, the upper LED module may be cooled by means of the upper LED cooling blower. For this purpose, the lower LED cooling blower and the upper LED cooling blower may draw ambient air in for example from rear-side surroundings of the apparatus for growing plants and conduct said air past the first LED module and the second LED module respectively. For example, the LED cooling blowers may draw ambient air in and conduct it past cooling fins arranged over the LED modules such that heat generated by the LED modules is dissipated.

In various embodiments, the method for growing plants may furthermore include circulating air in the accommodating space by means of at least one blower of the climate control device, and feeding fresh air by means of at least one fresh-air blower of the climate control device. In other words, the controller may on the one hand actuate the climate control device such that the air present in the accommodating space is circulated by means of the at least one blower. In various embodiments, for the regulation of the interior space climate in the accommodating space in the method for growing plants, the controller may on the other hand actuate the fresh-air blower such that fresh air from the surroundings is fed to the accommodating space. For example, the controller may actuate the fresh-air blower such that fresh air from the surroundings is fed to the accommodating space at preset times, for example at preset times of the day. Alternatively, the controller may actuate the fresh-air blower such that fresh air from the surroundings is fed to the accommodating space at regular intervals. Here, excess air may flow back into the surroundings via air outlet openings arranged on the front side of the apparatus.

Furthermore, in various embodiments, the controller may actuate the fresh-air blower such that fresh air is fed to the accommodating space if the $CO_2$ content in the accommodating space becomes too high. For this purpose, the method may additionally include determining a $CO_2$ content of the air in the accommodating space by means of a $CO_2$ sensor. The $CO_2$ sensor may, as described with reference to FIG. 7, be arranged for example in the side wall of the housing of the apparatus. For example, the $CO_2$ sensor may be integrated in a combined air humidity-temperature-$CO_2$ sensor.

The $CO_2$ sensor may transmit measured signals relating to the $CO_2$ content of the air in the accommodating space to the controller. In other words, the controller may receive sensor data from the $CO_2$ sensor. Furthermore, the controller may actuate the fresh-air blower by means of the climate control device on the basis of the data received from the $CO_2$ sensor, for example on the basis of measured values received from the $CO_2$ sensor, such that the $CO_2$ content of the air in the accommodating space does not exceed a preset value. This may be ensured by virtue of fresh air from the surroundings of the apparatus for growing plants being blown into the accommodating space by means of the fresh-air blower.

The fresh air fed to the accommodating space by means of the fresh-air blower may furthermore be filtered by means of activated carbon filters such that no dust or other contaminants in the ambient air are blown into the accommodating space, and, when the fresh-air blower is deactivated, no odors can flow out of the accommodating space. Furthermore, the air that flows back into the surroundings from the accommodating space may in this case be filtered by means of further activated carbon filters at the air outlet openings such that no odors are released from the accommodating space into the surroundings.

In various embodiments, in the regulation of the climate control device, the controller may regulate the interior space climate in each storey, or in other words the microclimate, by means of climate control data, adapted individually to the seeds accommodated in the corresponding storey of the accommodating space, of the program controller. In other words, the program controller may include climate control data, wherein the climate control data may be adapted to the seeds arranged on the seed mats (or to the plants growing on said seed mats). In accordance with the climate control data, the controller may actuate the climate control device such that an interior space climate, that is to say microclimate, adapted to the corresponding introduced seeds is set in each of the storeys.

For example, the program controller may include climate control data adapted to the seeds (or the plants) arranged (or growing) on the seed mats placed onto the lower mat carriers. In accordance with said climate control data, the controller may set, in the region of the lower storey, a microclimate which is adapted to the growth of the plants growing on the lower mat carrier. Furthermore, the program controller may include climate control data adapted to the seeds arranged on the seed mats placed onto the upper mat carriers. In accordance with said climate control data, the controller may set, in the region of the upper storey, a microclimate which is adapted to the growth of the plants growing on the upper mat carrier.

In various embodiments, the method may furthermore include accessing, from a data memory of the program controller, illumination data and/or irrigation data and/or climate control data individually adapted to the seeds. For example, the illumination data and/or irrigation data and/or climate control data individually adapted to the seeds may be accessed by means of the controller from a data memory of the program controller. Subsequently, the controller may actuate the illumination apparatus, the irrigation apparatus and the climate control device on the basis of the illumination data and/or irrigation data and/or climate control data individually adapted to the seeds such that, in the accommodating space, an interior space climate conducive to the growth of the plants growing therein is set.

Here, the data memory may be provided as an external data memory by means of an Internet connection provided in the apparatus for growing plants. In other words, the controller may access corresponding data from an external data memory by means of an Internet connection which is provided by means of corresponding antennae of the apparatus for growing plants.

In various embodiments, the method may furthermore include identifying at least one seed mat by means of a program sensor for the control of the program controller. For example, the controller may detect RFID signals or a QR label or a barcode of the at least one seed mat by means of the program sensor for the control of the program controller. Here, the program sensor may be provided as an RFID sensor and/or QR code sensor and/or barcode sensor. In other words, the controller may identify the seeds arranged on the respective seed mat (or the plants that have germinated on the respective seed mat) by means of the RFID signals or the QR label or the barcode of the seed mats, access the climate control data adapted to the respective seeds (or to the respective plants) from the data memory, and adjust the interior space climate prevailing in the accommodating space to the respective seeds (or to the respective plants).

In this way, in various embodiments, in accordance with the method for growing plants, the interior space climate adapted to the seeds may be adjusted by means of the controller. For example, the controller may produce a microclimate adapted to the respective seeds growing in the corresponding growing unit by means of the program controller on the basis of the accessed climate control data. In other words, the controller may actuate the irrigation apparatus, the illumination apparatus and the climate control device on the basis of the accessed climate control data such that a microclimate adapted to the seeds in the corresponding growing unit is set.

In various embodiments, in the method, the irrigation apparatus may furthermore feed water and nutrients to the irrigation troughs which are arranged in each of the one or more growing units under the respective seed mats. In other words, in the method for growing plants, in each growing unit, water and nutrients may be fed by the irrigation apparatus, by means of the irrigation troughs, to the seeds arranged on the seed mats or to the plants growing from said seeds.

Furthermore, the method for growing plants may include recording images of the plants growing from the seeds accommodated in the accommodating space by means of at least one camera. Here, the method may furthermore include the steps of transmitting signals from the at least one camera to the program controller, comparing the images recorded by means of the camera with one or more reference images stored in a pattern recognition memory of the controller in order to determine a state of the plants accommodated in the accommodating space by means of a pattern recognition apparatus of the controller, and adapting the program controller to the respective plant and to the state of said plant.

In detail, the camera arranged in the apparatus may record images by means of which, using stored reference images, the growth progress and thus the state of the plants growing in the accommodating space may be determined. For this purpose, the controller may transmit the images recorded by the camera to the program controller. The reference images for the comparison of the recorded images may be stored in the external data memory. The controller may furthermore, by means of the pattern recognition apparatus, compare the images recorded by the camera with the stored reference images and, from this, determine the growth progress or a present state of the plants. Furthermore, the controller may actuate the program controller such that an interior space climate adapted to the state of the plants in the accommodating space is set in the accommodating space. For example, the program controller may be actuated so as to set a microclimate adapted to the plants growing in each storey of the accommodating space.

In various embodiments, by means of the identification of the seeds and the determination of the present state of the plants growing from said seeds, the controller may thus actuate the irrigation apparatus, the illumination apparatus and the climate control device such that an interior space climate or microclimate adapted to the respective plants growing in the growing unit, and to the state of said plants, for example to the growth progress of said plants, is produced.

In various embodiments, the method may furthermore include determining whether a door of the apparatus is open or closed by means of a door sensor. In other words, in the method for growing plants, furthermore, it may be determined, by means of the door sensor, whether a door of the apparatus is open or closed. Here, the door sensor may optionally be an IR sensor. For this purpose, the door sensor may transmit the corresponding measured signals to the controller. In other words, the controller may receive signals from the door sensor.

In various embodiments, the controller may, when the door is open, actuate the irrigation apparatus, the illumination apparatus and the climate control device such that the user can for example handle the seed mats in the accommodating space. This means that, when the door is open, the controller may for example actuate the illumination apparatus such that light of a spectral composition in which the user can see clearly (or in other words of a spectral composition visible to the user) is emitted, and may actuate the climate control device such that the at least one cooling blower is deactivated. In other words, the controller may for example, when the door is open, actuate the illumination apparatus such that light of a spectral composition is emitted such that the accommodating space is illuminated normally for a user, and he or she can see clearly but is not blinded, or his or her eyes are not damaged. Furthermore, the controller may for example, when the door is open, actuate the climate control device such that the cooling blower does not run, such that a noise level prevailing in the apparatus is reduced when the door is open, and the energy consumed by the cooling blower is reduced. Furthermore, the controller may for example, when the door is open, actuate the irrigation apparatus such that no water is fed to the irrigation troughs, such that the user can for example remove seed mats or plants from the accommodating space or introduce new seed mats or plants into the accommodating space without the risk of water being spilt.

For example, the controller may, when the door is open, actuate the irrigation apparatus such that no water is circulated by pumping in the water circuit system, and may, when the door is closed, actuate the irrigation apparatus such that water from the water tank is circulated by pumping in the water circuit system. Likewise, the controller may for example actuate the water circuit system such that, when the door is open, no water from the water tank is fed to the irrigation troughs and, when the door is closed, water from the water tank is fed to the irrigation troughs. Furthermore, the controller may actuate the water circuit system such that, when the door is open, no water from the water tank is fed to an apparatus for purifying the water and, when the door is closed, water from the water tank is fed to the apparatus for purifying the water. In this way, it is possible to prevent water overflowing from or running out of the irrigation troughs in an uncontrolled manner in the event of the door being open during the filling of the irrigation troughs, whereby a consumer, for example when handling the seed mats or plants arranged over the irrigation troughs, is protected from becoming wet or from spilling water in the surroundings of the apparatus.

By contrast, in various embodiments, when the door is closed, the controller may actuate the irrigation apparatus, the illumination apparatus and the climate control device such that, again, the interior space climate adapted to the respective plants growing in the growing unit, and to the state of said plants, is produced. For example, the illumination apparatus may be actuated by the controller such that light in a wavelength range which is particularly conducive or beneficial to the germination of the seeds or to plant growth, for example with a mixture of light in the wavelength range for green light and for red light of the spectrum, or in some other spectral composition, is emitted. For example, the illumination apparatus may emit light of an above-described spectral composition of light with a wavelength of 450 nm, light with a wavelength of 660 nm and light with a wavelength of 730 nm. Furthermore, the climate control device may be actuated by the controller such that the at least one cooling blower is activated when this is necessary for maintaining the interior space climate in the accommodating space.

For example, the climate control device may be actuated by the controller such that the air in the accommodating space is warmed or cooled by virtue of the cooling blower being activated if the air temperature in the accommodating space is too high or by virtue of the cooling blower being deactivated if the air temperature in the accommodating space is too low. Furthermore, the irrigation device may be actuated by the controller such that water and nutrients are fed to the irrigation troughs such that the plants are provided with an optimal supply.

Altogether, the embodiments, provided here, of the apparatus for growing plants and of a method for growing plants can ensure the provision of an environment in which plants, such as for example herbs, vegetables, mushrooms, fruit and salad, can be grown from seeds on a scale that is also practicable in modern kitchens. In this way, by means of the present apparatus, it is made possible for the average consumer, in particular residents of large cities, to add fresh ingredients to their diet in accordance with their personal, and in so doing to firstly ensure a desired quality and secondly limit the effort required for this to the level that is possible in modern working life.

In various embodiments, by means of the provided embodiments of the climate control device of the present apparatus, it is ensured that, during the germination and growth of the plants in the accommodating space of the apparatus, an interior space climate can be provided which is particularly beneficial to the plant types cultivated in the apparatus and to the state of said plants, for example to the growth progress thereof.

Here, the particular configuration of the climate control device, provided in various embodiments, of the present apparatus ensures that, in each of the storeys of the apparatus, for the plants accommodated therein, an air temperature and air humidity optimum for the growth of said plants is set in a specific manner, wherein these parameters are monitored and regulated by means of corresponding sensors. Here, in various embodiments, the regulation incorporates, by means of the controller provided for this purpose, not only the measured values of the various sensors but in particular also items of information relating to the introduced plant type and relating to the state, determined by means of a camera, of the plants growing therefrom, for which purpose it is furthermore possible for items of information relating to the specific requirements of individual seed or plant types, and for the comparison of the camera images, to be accessed from a data memory.

In various embodiments, an apparatus for growing plants is provided, which includes an irrigation apparatus, an illumination apparatus, a climate control device, an accommodating space for accommodating one or more seed mats, and a control unit (as an example a controller) which is configured to control the irrigation apparatus, the illumination apparatus and the climate control device by means of a program controller. The apparatus for growing plants furthermore includes at least one air humidity sensor for determining the air humidity in the accommodating space, and at least one temperature sensor for determining the air temperature in the accommodating space.

The controller may be configured to receive measured values from the air humidity sensor and from the temperature sensor.

In various embodiments, the controller is configured to regulate an interior space climate prevailing in the accommodating space by means of the climate control device on the basis of the sensor values determined for the air humidity and for the air temperature.

The controller may be configured to regulate the air temperature on the basis of the determined temperature sensor values.

In various embodiments, the climate control device furthermore includes a cooling appliance for setting the air temperature and the air humidity in the accommodating space, wherein the cooling appliance optionally includes an evaporator.

In various embodiments, the controller is configured to lower the air temperature in the accommodating space by means of the cooling appliance.

The controller may be configured to control or regulate, or in other words to vary, the air temperature in the accommodating space by means of a light quantity radiated by the illumination apparatus.

In various embodiments, the controller is configured to regulate the air humidity in the accommodating space by means of the evaporator.

In various embodiments, the climate control device includes a fresh-air blower.

In various embodiments, inlet openings of the fresh-air blower and/or air outlet openings of the apparatus include activated carbon filters.

In various embodiments, the climate control device includes at least one cooling blower for cooling air present (or located) in the accommodating space.

In various embodiments, the apparatus furthermore includes one or more growing units which are introduced into the accommodating space, wherein each growing unit forms a storey in the accommodating space, wherein each growing unit includes an irrigation trough, an LED module, one or more mat carriers and one or more seed mats, and wherein each of the seed mats includes seeds.

In various embodiments, the climate control device includes a cooling blower for each storey and an LED cooling blower for each LED module.

In various embodiments, the program controller includes climate control data adapted individually to seeds accommodated in the accommodating space.

In various embodiments, for the program controller, a data memory is provided from which the climate control data and/or irrigation data and/or illumination data adapted individually to the seeds may be accessed, wherein the data memory may be provided as an external data memory via an Internet connection provided in the apparatus.

In various embodiments, the apparatus includes at least one program sensor, wherein the program sensor is provided as an RFID sensor and/or QR code sensor and/or barcode sensor, which may detect RFID signals and/or a QR label and/or a barcode, respectively, of at least one seed mat for the control of the program controller.

In various embodiments, the controller is configured to set an interior space climate adapted to the seeds in the corresponding growing unit by means of the program controller on the basis of the climate control data.

In various embodiments, the controller is configured to control the irrigation apparatus, the illumination apparatus and the climate control device such that a microclimate adapted to the seeds in the corresponding growing unit is set.

In various embodiments, the irrigation apparatus is configured to supply water and nutrients to the one or more irrigation troughs which are arranged in each of the growing units under the respective seed mats.

In various embodiments, the apparatus furthermore includes a camera for recording images of the seed mats accommodated in the accommodating space and of plants growing from the seeds.

In various embodiments, the controller includes a pattern recognition apparatus and an associated pattern recognition memory and is configured to transmit signals from the camera to the program controller.

In various embodiments, the controller is furthermore configured to, by means of the pattern recognition apparatus, compare the images recorded by means of the camera with one or more reference images stored in the pattern recognition memory in order to determine a state of the plants accommodated in the accommodating space in order to thus adapt the program controller to the state of the plants.

In various embodiments, the controller is configured to control the irrigation apparatus, the illumination apparatus and the climate control device such that an interior space climate adapted to the respective plants growing in the growing unit, and to the state of said plants, is adjusted.

In various embodiments, the apparatus furthermore includes a door sensor for determining whether a door of the apparatus is open or closed, wherein the door sensor is optionally an IR sensor.

In various embodiments, the controller is configured to receive signals from the door sensor.

In various embodiments, the controller is configured to, when the door is open, actuate the illumination apparatus such that light of a spectral composition visible to the user is radiated, actuate the irrigation apparatus such that no water is fed to the irrigation troughs, and actuate the climate control device such that the at least one cooling blower is deactivated, and wherein the controller is configured to, when the door is closed, actuate the irrigation apparatus, the illumination apparatus and the climate control device such that the interior space climate adapted to the respective plants growing in the growing unit, and to the state of said plants, is produced.

In various embodiments, a method for growing plants is provided, including introducing one or more seed mats into an accommodating space of an apparatus for growing plants, actuating an irrigation apparatus, an illumination apparatus and a climate control device of the apparatus for growing plants by means of a program controller of a controller, determining the air humidity in the accommodating space by means of at least one air humidity sensor, and determining the air temperature in the accommodating space by means of at least one temperature sensor.

In various embodiments, the method furthermore includes feeding measured values from the air humidity sensor and from the temperature sensor to the controller.

In various embodiments, the method furthermore includes regulating an interior space climate prevailing in the accommodating space by means of the climate control device on the basis of the sensor values determined for the air humidity and for the air temperature by means of the controller.

In various embodiments, the controller regulates the air temperature on the basis of the determined temperature sensor values.

In various embodiments, the air temperature and the air humidity in the accommodating space are adjusted by means of a cooling appliance of the climate control device, wherein the cooling appliance optionally includes an evaporator.

In various embodiments, the controller lowers the air temperature in the accommodating space by means of the cooling appliance.

In various embodiments, the controller increases the air temperature in the accommodating space by means of a heat quantity radiated by the illumination apparatus.

In various embodiments, the controller regulates the air humidity in the accommodating space by means of the evaporator.

In various embodiments, the method furthermore includes circulating air in the accommodating space by means of at least one blower of the climate control device, and feeding fresh air by means of at least one fresh-air blower of the climate control device.

In various embodiments, the method furthermore includes purifying the fresh air fed by means of the fresh-air blower at inlet openings of the fresh-air blower and/or at air outlet openings of the apparatus by means of activated carbon filters.

In various embodiments, the method furthermore includes cooling air present (or located) in the accommodating space by means of at least one cooling blower of the climate control device.

In various embodiments, the method furthermore includes introducing one or more growing units into the accommodating space, wherein each growing unit forms a storey in the accommodating space, and wherein each growing unit includes an irrigation trough, at least one LED module and one or more mat carriers, and placing one or more seed mats onto each of the mat carriers, wherein each of the seed mats includes seeds.

In various embodiments, the method furthermore includes cooling the air in each storey by means of a cooling blower and cooling each LED module by means of at least one LED cooling blower.

In various embodiments, the controller regulates the interior space climate in each storey by means of climate control data, adapted individually to the seeds accommodated in the accommodating space, of the program controller.

In various embodiments, the method furthermore includes includes accessing illumination data and/or irrigation data and/or climate control data adapted individually to the seeds from a data memory of the program controller, wherein the data memory may be provided as an external data memory by means of an Internet connection provided in the apparatus for growing plants.

In various embodiments, the method furthermore includes detecting RFID signals and/or a QR label and/or a barcode of at least one seed mat by means of a program sensor for the control of the program controller, wherein the program sensor is provided as an RFID sensor and/or QR code sensor and/or barcode sensor.

In various embodiments, the controller adjusts an interior space climate adapted to the seeds in the corresponding growing unit by means of the program controller on the basis of the climate control data.

In various embodiments, the controller actuates the irrigation apparatus, the illumination apparatus and the climate control device such that a microclimate adapted to the seeds in the corresponding growing unit is set.

In various embodiments, the irrigation apparatus feeds water and nutrients to the one or more irrigation troughs which are arranged in each of the growing units under the respective seed mats.

In various embodiments, the method furthermore includes recording, by means of a camera, images of plants growing from the seeds introduced into the accommodating space.

In various embodiments, the method furthermore includes transmitting signals from the camera to the program controller, comparing the images recorded by means of the camera with one or more reference images stored in a pattern recognition memory of the controller in order, by means of a pattern recognition apparatus of the controller, to determine a state of the plants accommodated in the accommodating space, and adapting the program controller to the respective plant and to the state of said plant.

In various embodiments, the controller actuates the irrigation apparatus, the illumination apparatus and the climate control device such that an interior space climate adapted to the respective plants growing in the growing unit, and to the state of said plants, is produced.

In various embodiments, the method furthermore includes determining whether a door of the apparatus is open or closed by means of a door sensor, wherein the door sensor is optionally an IR sensor.

In various embodiments, the controller receives signals from the door sensor.

In various embodiments, the controller, when the door is open, actuates the illumination apparatus such that light of a spectral composition visible to the user is radiated, actuates the climate control device such that the at least one cooling blower is deactivated, and actuates the irrigation apparatus such that no water is fed to the irrigation troughs, and the controller, when the door is closed, actuates the irrigation apparatus, the illumination apparatus and the climate control device such that the microclimate adapted to the respective plants growing in the growing unit, and to the state of said plants, is produced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus for growing plants, comprising:
an irrigation apparatus;
an illumination apparatus;
a climate control device;
an accommodating space for accommodating one or more seed mats;
a controller which is configured to control the irrigation apparatus, the illumination apparatus and the climate control apparatus by means of a program controller;
at least one air humidity sensor for determining an air humidity in the accommodating space;
at least one temperature sensor for determining an air temperature in the accommodating space; and
a door sensor for determining whether a door of the apparatus is open or closed,
wherein the controller is configured to, when the door is open, actuate the illumination apparatus such that light of a spectral composition visible to the user is emitted, actuate the irrigation apparatus such that no water is fed to the irrigation troughs, and actuate the climate control device such that the at least one cooling blower is deactivated; and
wherein the controller is configured to, when the door is closed, actuate the irrigation apparatus, the illumination apparatus and the climate control device such that the interior space climate adapted to the respective plants growing in the growing unit, and to the state of said plants, is produced.

2. The apparatus of claim 1,
wherein the controller is configured to receive measured values from the air humidity sensor and from the temperature sensor.

3. The apparatus of claim 2,
wherein the controller is configured to regulate an interior space climate prevailing in the accommodating space by means of the climate control device on the basis of the sensor values determined for the air humidity and for the air temperature.

4. The apparatus of claim 1,
wherein the climate control device furthermore comprises a cooling appliance for setting the air temperature and the air humidity in the accommodating space.

5. The apparatus of claim 4,
wherein the cooling appliance comprises an evaporator.

6. The apparatus of claim 1,
wherein the climate control device comprises at least one cooling blower for cooling air located in the accommodating space.

7. The apparatus of claim 1, further comprising:
one or more growing units which are introduced into the accommodating space;
wherein each growing unit forms a storey in the accommodating space;
wherein each growing unit comprises an irrigation trough, an LED module, one or more mat carriers and one or more seed mats; and
wherein each of the seed mats comprises seeds.

8. The apparatus of claim 7,
wherein the program controller comprises climate control data adapted individually to seeds accommodated in the accommodating space.

9. The apparatus of claim 1,
wherein the apparatus comprises at least one program sensor;
wherein the program sensor is provided as at least one of an RFID sensor, or QR code sensor, or barcode sensor, which may detect at least one of RFID signals, or a QR label, or a barcode, respectively, of at least one seed mat for the control of the program controller.

10. The apparatus of claim 9,
wherein the controller is configured to set an interior space climate adapted to the seeds in the corresponding growing unit by means of the program controller on the basis of the climate control data.

11. The apparatus of claim 1,
wherein the door sensor is an IR sensor.

\* \* \* \* \*